United States Patent [19]

Kobayashi et al.

[11] Patent Number: 5,722,055
[45] Date of Patent: Feb. 24, 1998

[54] PORTABLE RADIOTELEPHONE TERMINAL ADAPTABLE TO MULTIPLE MODELS

[75] Inventors: Hidekatsu Kobayashi; Hiroshi Kubo; Hiroaki Sakashita; Daizo Funaya; Yoshifumi Tsukamoto; Masashi Tomura, all of Sapporo, Japan

[73] Assignee: Fujitsu Limited, Kanagawa, Japan

[21] Appl. No.: 539,006

[22] Filed: Oct. 4, 1995

[30] Foreign Application Priority Data

Feb. 16, 1995 [JP] Japan ................................. 7-028462

[51] Int. Cl.⁶ ..................................... H04B 1/38
[52] U.S. Cl. .................... 455/90; 455/128; 455/351
[58] Field of Search .................. 455/89, 90, 347, 455/348, 349, 350, 351, 128, 566, 575, 301; 361/724, 731, 736, 760; 345/87; 340/815.45, 815.49; 379/433

[56] References Cited

U.S. PATENT DOCUMENTS

| | | | |
|---|---|---|---|
| 4,199,204 | 4/1980 | Hodsdon et al. | 455/90 |
| 5,077,832 | 12/1991 | Szczutkowski et al. | 455/90 |
| 5,086,509 | 2/1992 | Inubushi et al. | 455/90 |
| 5,146,615 | 9/1992 | Hodsdon et al. | 455/351 |
| 5,257,310 | 10/1993 | Takagi et al. | 379/433 |
| 5,276,916 | 1/1994 | Pawlish et al. | 455/89 |
| 5,410,141 | 4/1995 | Koenck et al. | 455/90 |
| 5,577,267 | 11/1996 | Jungles-Butler et al. | 455/90 |

*Primary Examiner*—Edward F. Urban
*Attorney, Agent, or Firm*—Helfgott & Karas, P.C.

[57] ABSTRACT

A portable radiotelephone terminal includes a body assembly which carries out a radio communication, a rear case assembly, and a front case assembly associated with the rear case assembly for enclosing the body assembly. In the portable radiotelephone terminal, the body assembly and the rear case assembly include common parts which are shared by different models of the portable radiotelephone terminal, and the front case assembly includes model-dependent parts which are individually prepared for the different models of the portable radiotelephone terminal.

9 Claims, 36 Drawing Sheets

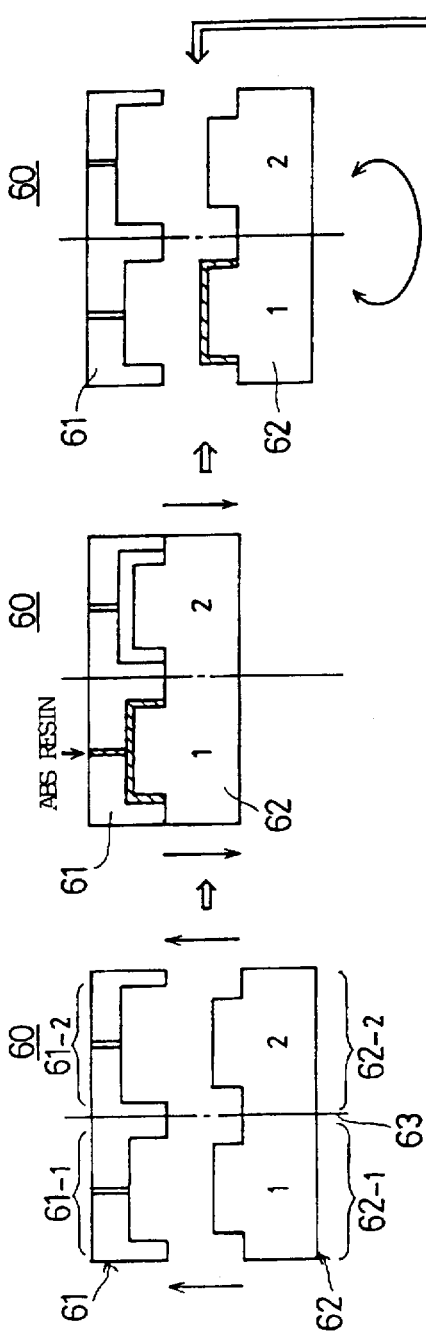
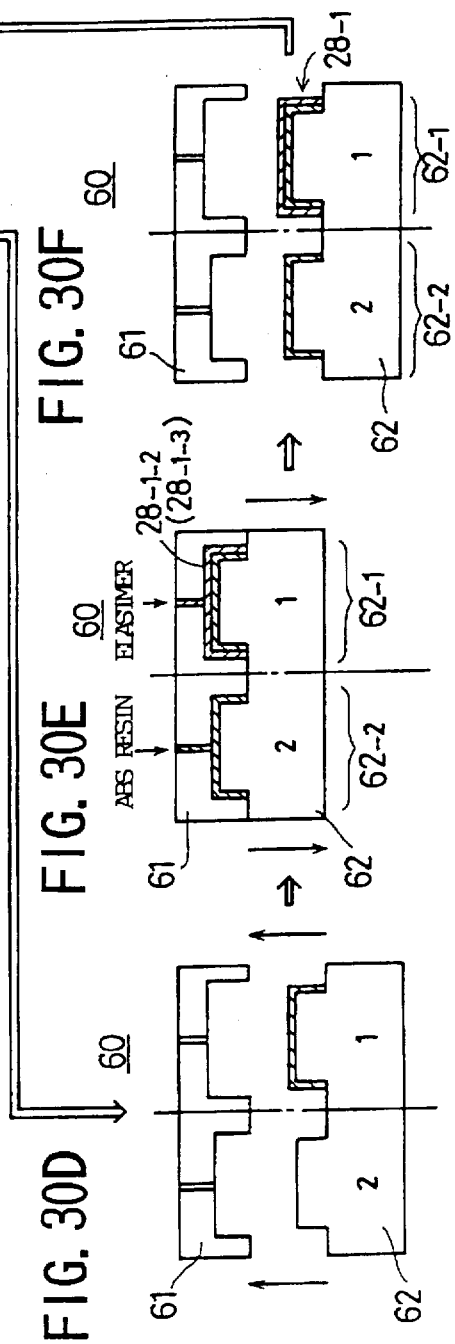

PORTABLE RADIOTELEPHONE TERMINAL ADAPTABLE TO MULTIPLE MODELS

BACKGROUND OF THE INVENTION

1. Field of the Invention

The present invention relates to a portable radiotelephone terminal, including a portable telephone, which carries out a radio communication.

To increase the production of portable radiotelephone terminals, it is important for manufacturers to reduce cost. Also, in order to increase the number of users of the portable radiotelephone terminals, it is important to meet various needs of the users including a reliability of the portable radiotelephone terminals and a provision of various models.

2. Description of the Related Art

A conventional portable radiotelephone terminal is disclosed in Japanese Patent Application No. 6-38713 which was assigned to the assignee of the present invention. This portable radiotelephone terminal is comprised of a body assembly including a printed-circuit board, a speaker unit and a microphone unit. The body assembly is enclosed in a case assembly including a front case assembly and a rear case assembly.

The above-mentioned portable radiotelephone terminal is constructed so as to facilitate assembly operations for the manufacture to some extent. However, taking into account individual portions of the above portable radiotelephone terminal, some portions need further improvements in order to reduce the cost of the manufacture. In addition, other portions of the above portable radiotelephone terminal are likely to allow an erroneous operation to be done by the operator.

SUMMARY OF THE INVENTION

An object of the present invention is to provide an improved portable radiotelephone terminal in which the above-described problems are eliminated.

Another object of the present invention is to provide a portable radiotelephone terminal which reduces the cost of the manufacture as much as possible.

Still another object of the present invention is to provide a portable radiotelephone terminal which provides a high reliability when it is used by the operator.

The above-mentioned objects of the present invention are achieved by a portable radiotelephone terminal which includes: a body assembly which carries out a radio communication; a rear case assembly; and a front case assembly associated with the rear case assembly for enclosing the body assembly, wherein the body assembly and the rear case assembly include common parts which are shared by different models of the portable radiotelephone terminal, and the front case assembly includes model-dependent parts which are individually prepared for the different models of the portable radiotelephone terminal.

The above-mentioned objects of the present invention are achieved by a portable radiotelephone terminal which includes: a body assembly including a speaker unit, a microphone unit and a switch unit which carry out a radio communication; a rear case assembly; and a front case assembly associated with the rear case assembly for enclosing the body assembly, the body assembly comprising: a shield case including a flat portion and recessed portions downwardly projecting from a bottom of the flat portion, the recessed portions being provided on peripheral portions of a bottom of the shield case; a shield packing fitted in grooves of the recessed portions of the shield case, the shield packing being made of a conductive rubber and provided along the recessed portions of the shield case; and a rear printed-circuit board provided below the shield case, the rear printed-circuit board having a grounding pattern which is in accordance with the recessed portions of the shield case, the grounding pattern being brought into contact with the shield packing, the rear case assembly comprising a rear case member having a plurality of ribs to which a bottom of the rear printed-circuit board is connected, wherein the shield case of the body assembly is connected to the rear case assembly such that the bottom of the rear printed-circuit board is pressed by the ribs, a top of the rear printed-circuit board is pressed by the recessed portions of the shield case, and the grounding pattern of the rear printed-circuit board is press fitted to the shield packing.

The above-mentioned objects of the present invention are achieved by a portable radiotelephone terminal which includes: a body assembly including a speaker unit, a microphone unit and a switch unit which carry out a radio communication; a rear case assembly; and a front case assembly, connected to the rear case assembly by fastening screws, for enclosing the body assembly, the body assembly comprising: a shield case including a flat portion and recessed portions provided on a bottom of the flat portion; a shield packing fitted in grooves of the recessed portions of the shield case, the shield packing made of a conductive rubber and downwardly projecting from the bottom of the flat portion; and a rear printed-circuit board provided below the shield case, the rear printed-circuit board having a grounding pattern which is in accordance with the recessed portions of the shield case, the grounding pattern being contacted with the shield packing, the shield case including holes into which the screws are inserted, the holes provided at corners of the shield case, the rear case assembly comprising a rear case member which includes a bottom portion, a peripheral wall portion, and a plurality of bosses provided on the bottom portion at locations of the corners of the shield case, the bosses including holes into which the screws are inserted, and the bosses supporting the corners of the shield case, wherein the corners of the shield case of the body assembly are connected to the rear case assembly and the front case assembly by fastening the screws such that portions of the rear printed-circuit board adjacent the corners of the shield case are pressed by the rear case member, a top of the rear printed-circuit board is pressed by the recessed portions of the shield case, and the grounding pattern of the rear printed-circuit board is press fitted to the shield packing.

In the portable radiotelephone terminal of the present invention, the assembly operations for the manufacture can be more easily carried out, and it is possible to remarkably reduce the cost of the manufacture of the portable radiotelephone terminal. Also, it is possible to provide a high reliability when the portable radiotelephone terminal of the present invention is used by the operator.

BRIEF DESCRIPTION OF THE DRAWINGS

Other objects, features and advantages of the present invention will be more apparent from the following detailed description when read in conjunction with the accompanying drawings in which:

FIGS. 30A through 30F are diagrams for explaining a molding process for the front case member;

DESCRIPTION OF THE PREFERRED EMBODIMENT

A description will now be given of the preferred embodiment of the present invention with reference to the accompanying drawings.

The following description includes: (A) Construction of Model-1 and Model-2 Portable Telephones; (B) Body Assembly 22; (C) Rear Case Assembly 23; (D) Front Case Assembly 25 of Model-1 Portable Telephone; (E) Front Case Assembly 28 of Model-2 Portable Telephone; (F) Liquid Crystal Display Assembly 41-2; (G) Internal Construction of Model-1 and Model-2 Portable Telephones; and (H) Others.

(A) CONSTRUCTION OF MODEL-1 AND MODEL-2 PORTABLE TELEPHONES

Figure 1:
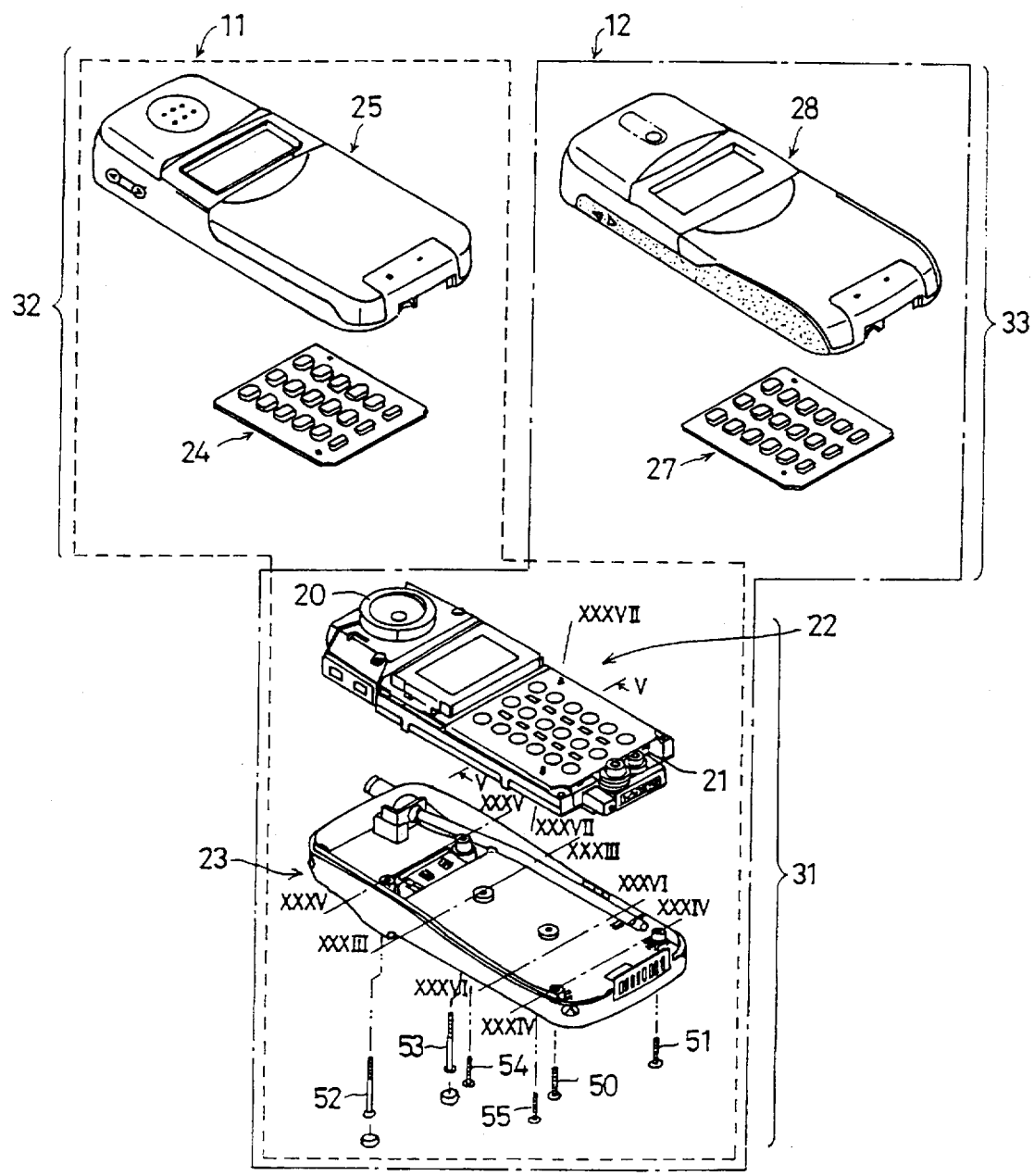
FIG. 1 is a diagram showing constructions of Model-1 and Model-2 portable telephones in one embodiment of the present invention.
Figure 2:
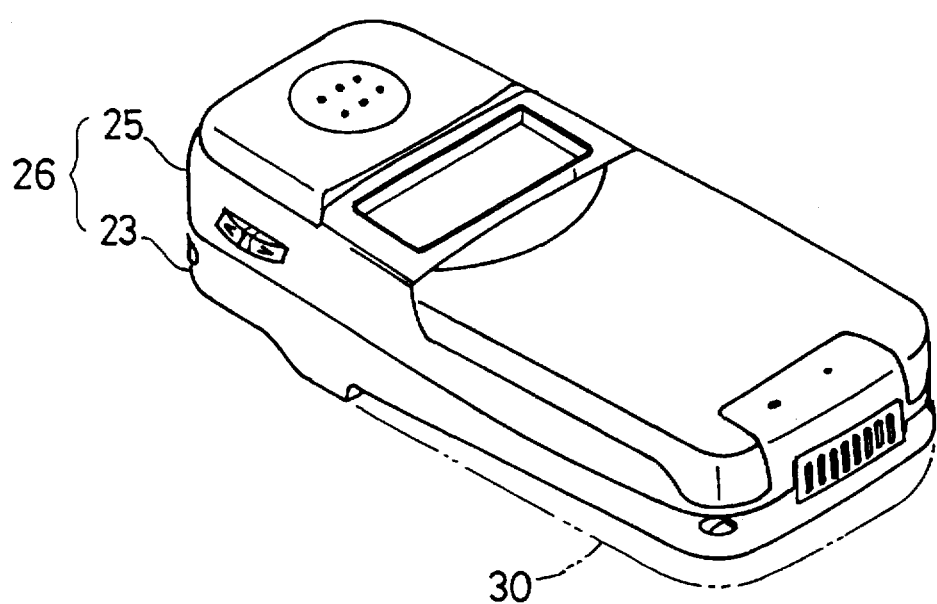
FIG. 2 is a perspective view of the Model-1 portable telephone.

FIG. 1 shows Model-1 and Model-2 portable telephones 11 and 12 which are the preferred embodiment of the present invention. FIG. 2 shows the Model-1 portable telephone 11 and FIG. 3 shows the Model-2 portable telephone 12.

Figure 3:
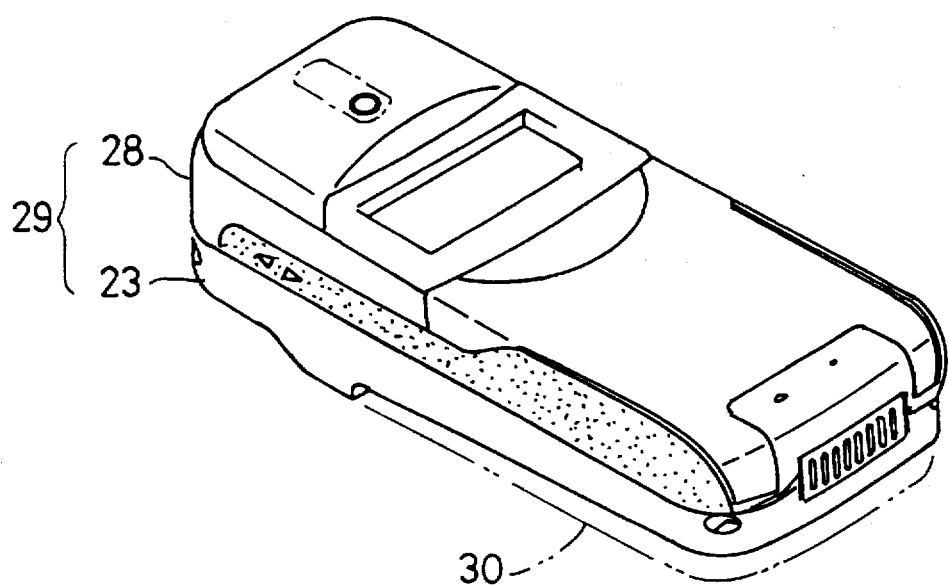
FIG. 3 is a perspective view of the Model-2 portable telephone.

Referring to FIGS. 1 through 3, the Model-1 portable telephone 11 comprises a body assembly 22 (including a speaker unit 20 and a microphone unit 21), a rear case assembly 23, a keypad 24, and a front case assembly 25. The body assembly 22 and the keypad 24 are enclosed in the rear case assembly 23 and the front case assembly 25. The front case assembly 25 and the rear case assembly 23 constitute a case assembly 26 for enclosing the body assembly 22 of the Model-1 portable telephone 11.

The Model-2 portable telephone 12 comprises the body assembly 22, the rear case assembly 23, a keypad 27, and a front case assembly 28. The body assembly 22 and the keypad 27 are enclosed in the rear case assembly 23 and the front case assembly 28. The front case assembly 28 and the rear case assembly 23 constitute a case assembly 29 for enclosing the body assembly 22 of the Model-2 portable telephone 12.

Each of the Model-1 and Model-2 portable telephones 11 and 12 includes a printed-circuit board (not shown in FIGS. 1 through 3).

When the Model-1 and Model-2 portable telephones 11 and 12 are used, a battery 30, indicated by a phantom line in each of FIGS. 2 and 3, is attached to the bottom of each of the case assemblies 26 and 29 to supply power.

As shown in FIG. 1, component parts of the Model-1 and Model-2 portable telephones 11 and 12 are classified into common parts 31, Model-1 parts 32, and Model-2 parts 33. The common parts 31 include parts of the body assembly 22 and the rear case assembly 23. The Model-1 parts 32 include parts of the keypad 24 and the front case assembly 25. The Model-2 parts includes parts of the keypad 27 and the front case assembly 28.

Accordingly, the two kinds of the portable telephones 11 and 12 share the common parts 31 relating to the productions of the body assembly 22 and the rear case assembly 23, and selectively use either the Model-1 parts 32 or the Model-2 parts 33 relating to the productions of the front case assembly 25 or 28 and the keypad 24 or 27, respectively.

Thus, in order to manufacture the two kinds of the portable telephones 11 and 12, it is not necessary to prepare two kinds of body assemblies and two kinds of rear case assemblies both of which are different from each other with respect to the Model-1 and the Model-2. Therefore, the cost of the manufacture of the Model-1 and Model-2 portable telephones 11 and 12 is reduced because of the use of the common parts 31.

(B) BODY ASSEMBLY 22

(B-1) Overview of Body Assembly 22

Figure 4:
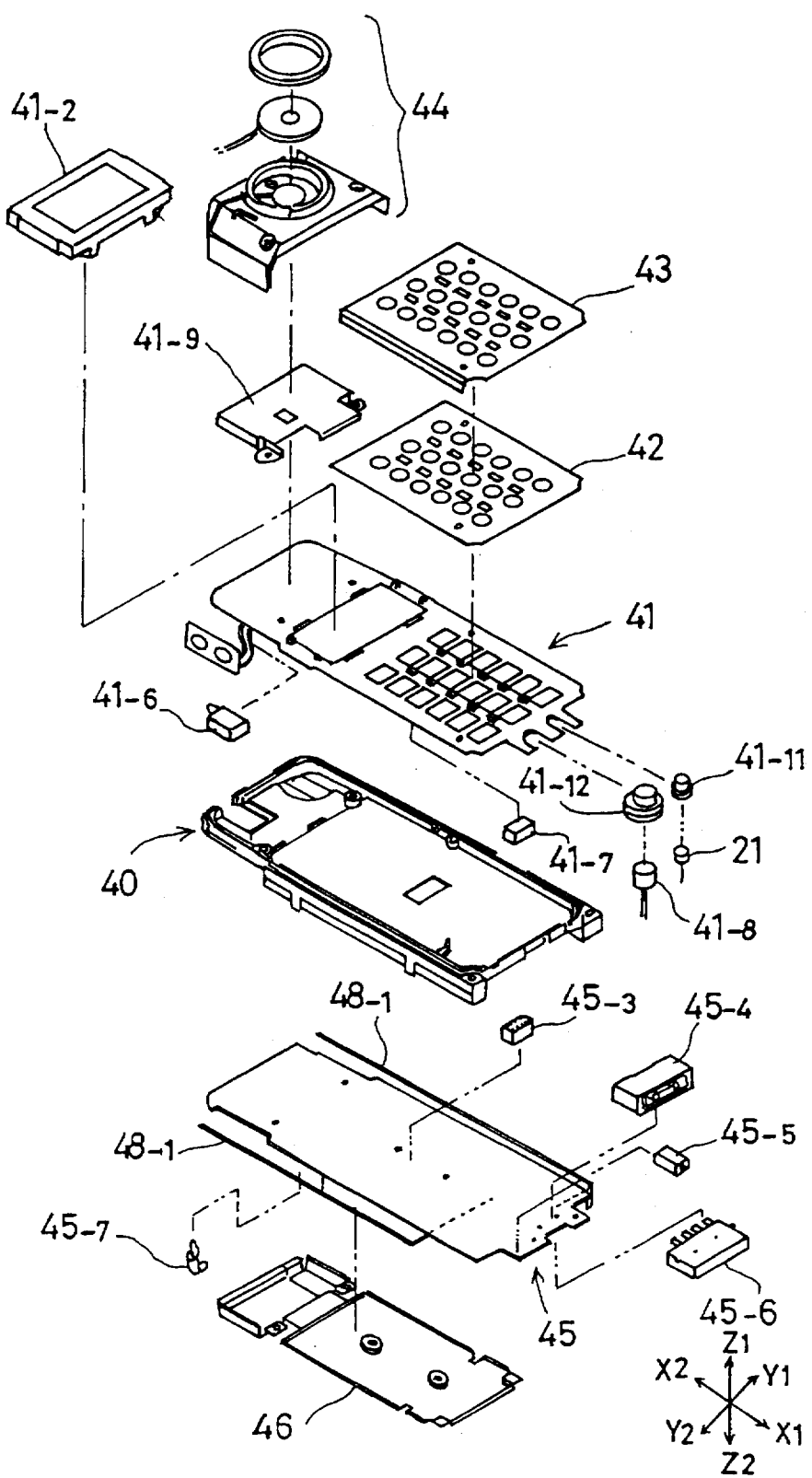
FIG. 4 is an exploded view of a body assembly of each of the Model-1 and Model-2 portable telephones.
Figure 5:
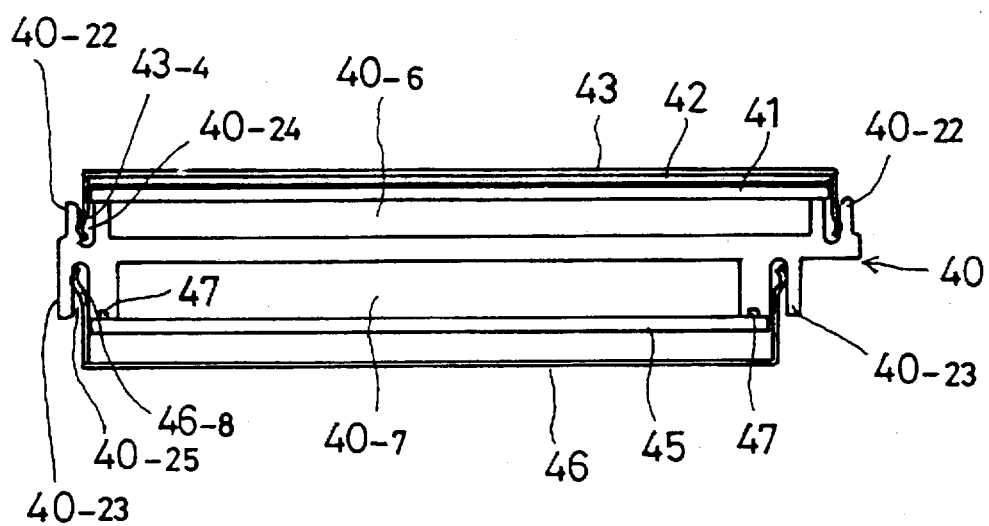
FIG. 5 is a cross-sectional view of the body assembly taken along a line V—V in FIG. 1.
Figure 6:
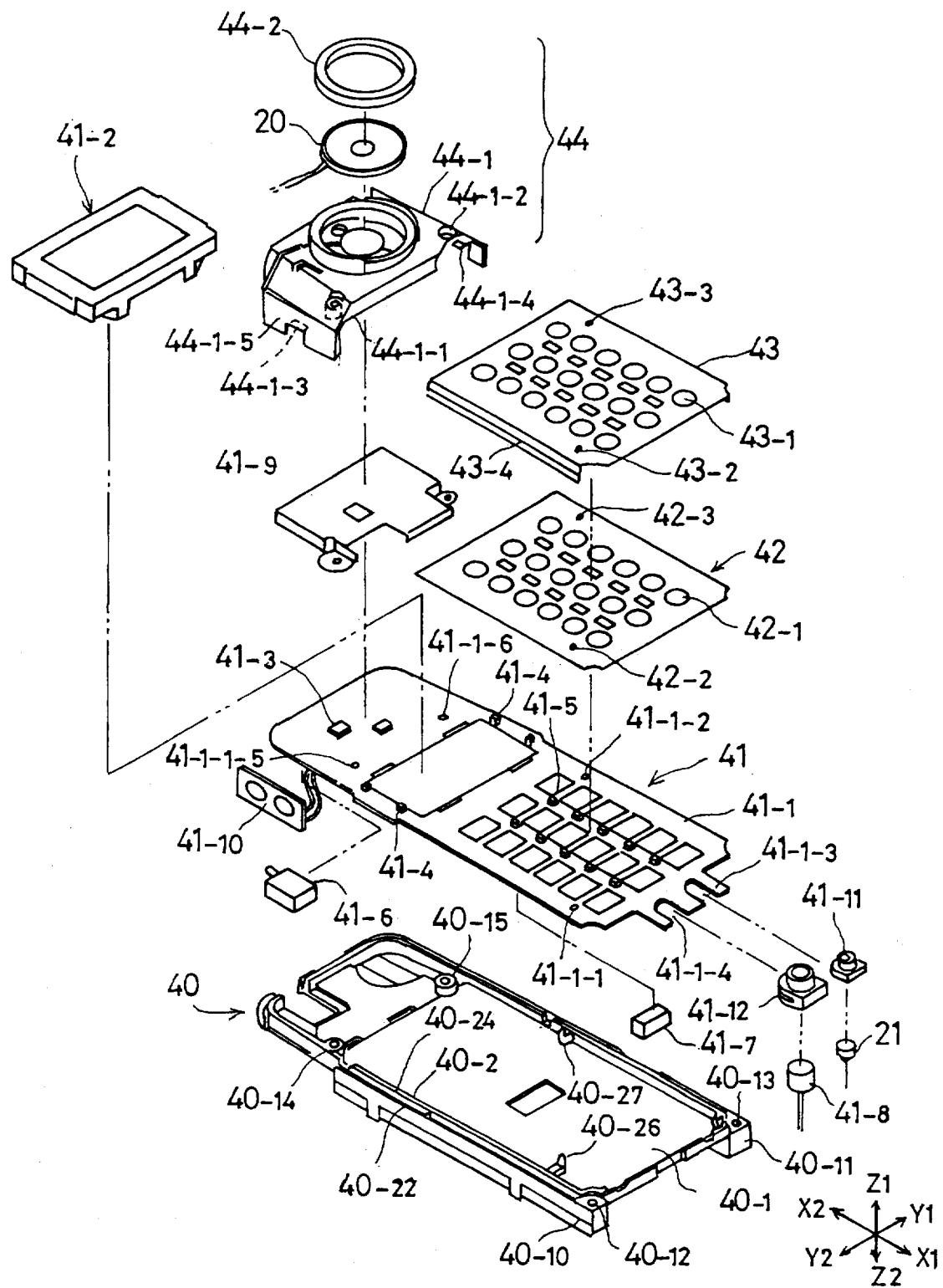
FIG. 6 is an exploded view of an upper portion of the body assembly above a shield case.

FIG. 4 shows a construction of the body assembly 22. FIG. 5 is a cross-sectional view of the body assembly 22 taken along a line V—V in FIG. 1. FIG. 6 shows an upper portion of the body assembly 22 above a shield case 40, and FIG. 7 shows a lower portion of the body assembly 22 below the shield case 40.

As shown in FIGS. 4 and 5, the body assembly 22 is constructed such that the shield case 40 is a base to which the parts of the body assembly 22 are attached.

Referring to FIGS. 4, 5 and 6, the upper portion of the body assembly 22 above the shield case 40 includes a front printed-circuit board (CU) assembly 41, a key-contact plate 42, a shield plate 43, and a speaker assembly 44.

Figure 7:
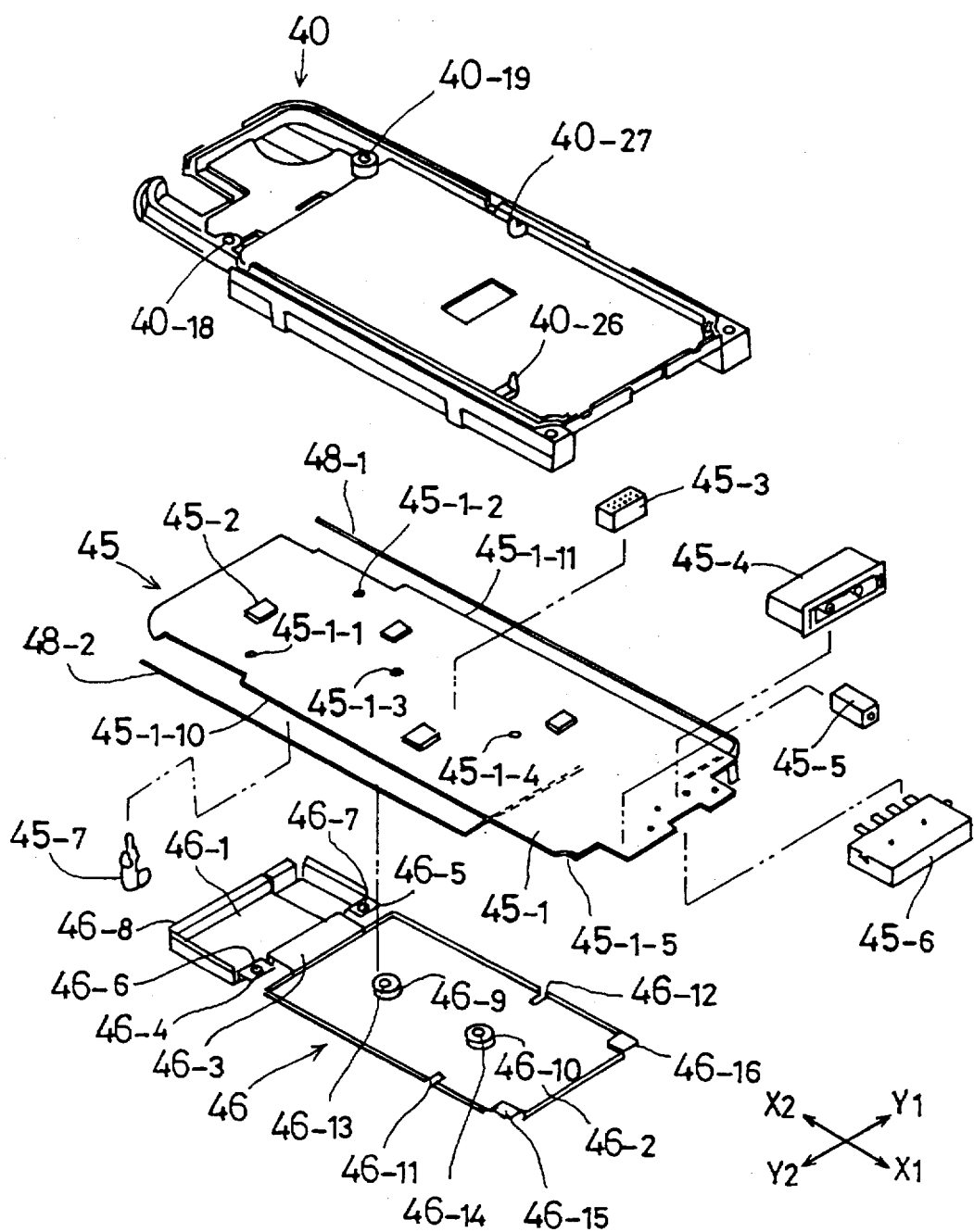
FIG. 7 is an exploded view of a lower portion of the body assembly below the shield case.

Referring to FIGS. 4, 5 and 7, the lower portion of the body assembly 22 below the shield case 40 includes a rear printed-circuit board (TU) assembly 45, a shield plate 46, and coaxial cables 48-1 and 48-2.

The shield plates 43 and 46 are attached to the shield case 40 by press fitting insert portions.

The shield plate 43 is attached to the shield case 40 by press fitting an insert portion 43-4 into a groove 40-24. Also, the shield plate 46 is attached to the shield case 40 by press fitting an insert portion 46-8 into a groove 40-25.

Before the body assembly 22 is incorporated in and secured to the case assembly 26 (or 29), the front printed-circuit board assembly 41, the key-contact plate 42, and the rear printed-circuit board assembly 45 are temporarily attached to the shield case 40 by using the shield plates 43 and 46.

A condition of the portable telephone after the body assembly 22 is secured to the case assembly 26 (or 29) will be described later.

(B-2) Shield Case 40

Figure 8:
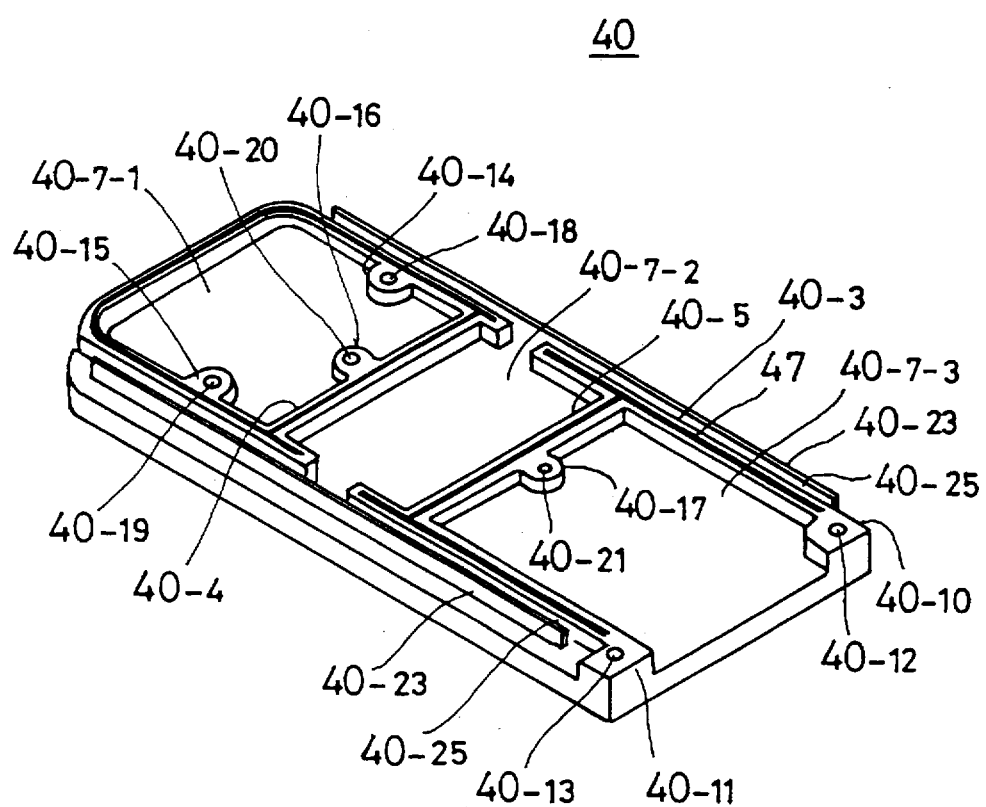
FIG. 8 is a perspective view of the shield case which is turned upside down.
Figure 9:
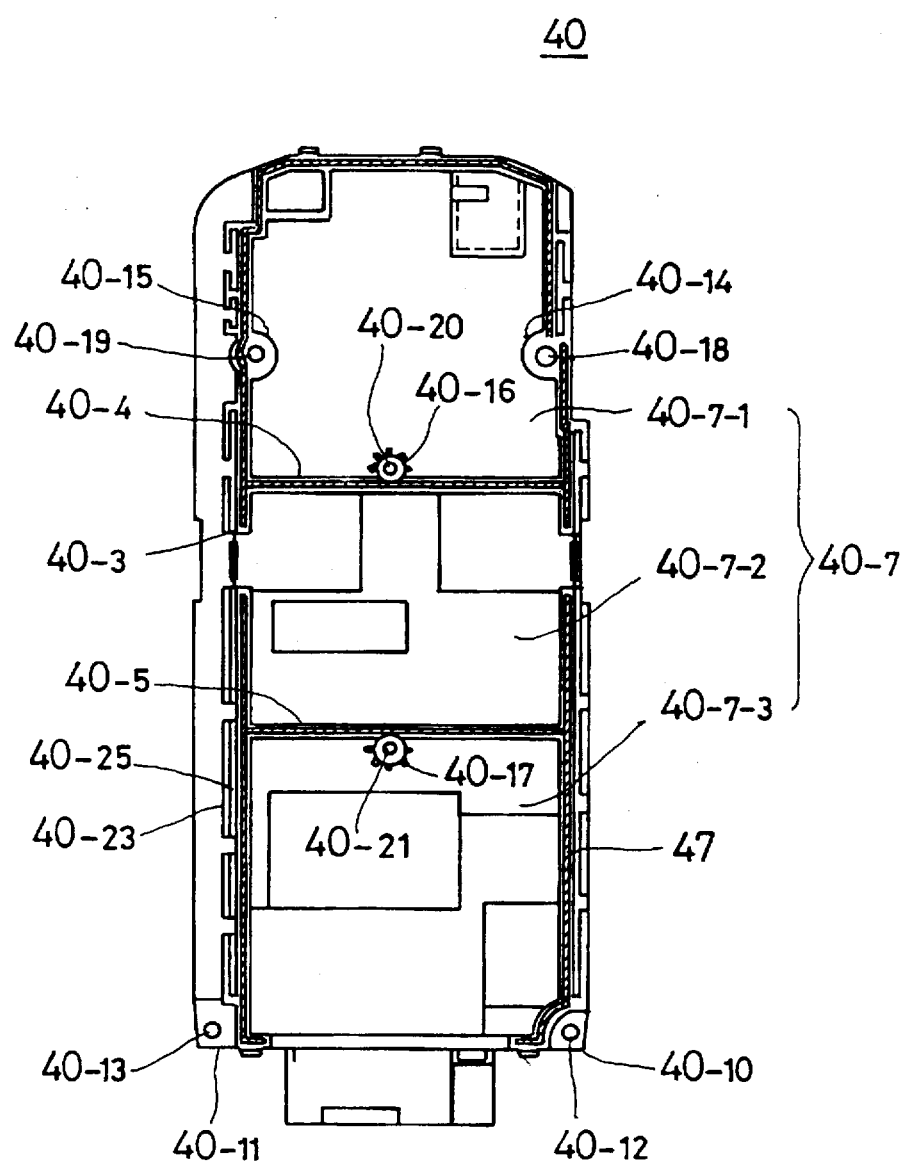
FIG. 9 is a bottom view of the shield case.

The shield case 40 is made of a resin molding which is plated with metal through electroplating. FIGS. 8 and 9 show the bottom of the shield case 40.

Referring FIGS. 6 through 9, the shield case 40 generally includes a rectangular flat portion 40-1, a top peripheral recessed portion 40-2, a bottom peripheral recessed portion 40-3, and bottom transverse recessed portions 40-4 and 40-5.

An area 40-6 on the top of the shield case 40, encircled by the recessed portion 40-2, and an area 40-7 on the bottom of the shield case 40, encircled by the recessed portions 40-3, 40-4 and 40-5, are locations in which electronic parts are included.

The area 40-7 on the bottom of the shield case 40 is divided by the recessed portions 40-4 and 40-5 into three areas 40-7-1, 40-7-2 and 40-7-3.

A shield packing 47 is press fitted into grooves of the recessed portions 40-3, 40-4 and 40-5. The shield packing 47 is made of a conductive rubber. The shield packing 47 slightly projects from the bottom surface of the shield case 40 to ensure shielding.

The shield case 40 includes corner portions 40-10 and 40-11 at edges of the flat portion 40-1 on one side of the shield case 40. Through holes 40-12 and 40-13 are formed in the corner portions 40-10 and 40-11, and tapping screws 50 and 51 are inserted in the through holes 40-12 and 40-13, respectively.

Four bosses 40-14, 40-15, 40-16, and 40-17 are formed in the area 40-7 on the bottom of the shield case 40. More specifically, the bosses 40-14, 40-15, and 40-16 are formed at three locations in the area 40-7-1, and the boss 40-17 is formed at a location in the area 40-7-3. Through holes 40-18 through 40-21 are formed in the bosses 40-14 through 40-17, and tapping screws 52 through 55 are inserted in the through holes 40-18 through 40-21, respectively.

In addition, the shield case 40 includes a rib 40-22 upwardly projecting from the periphery of the flat portion 40-1 and a rib 40-23 downwardly projecting therefrom. A groove 40-24 between the recessed portion 40-2 and the rib 40-22 and a groove 40-25 between the recessed portion 40-3 and the rib 40-23 which are relatively deep are also formed. Projecting portions of the above-mentioned shield plate 46 are inserted in the grooves 40-24 and 40-25.

Further, the shield case 40 includes locating portions 40-26 and 40-27 which upwardly project from the flat portion 40-1 on the top of the shield case 40, and these locating portions 40-26 and 40-27 are used to locate the key contact 42. As shown in FIGS. 6 and 7, the projecting portion 40-26 is at a position on the left-side periphery of the shield case 40 near the corner portion 40-11, and the projecting portion 40-27 is at a middle position on the right-side periphery of the shield case 40.

(B-3) Front Printed-Circuit Board Assembly 41

Referring to FIGS. 4 and 6, on the front printed-circuit board assembly 41, there are mounted a multi-layer printed-circuit board 41-1, a liquid crystal display (LCD) assembly 41-2, an electronic part 41-3, a display light-emitting diode 41-4, a keyboard light-emitting diode 41-5, connectors 41-6 and 41-7, the microphone unit 21, a buzzer 41-8, a shield plate member 41-9, and a volume key module 41-10.

The printed-circuit board 41-1 has a shape and dimensions which correspond to the shape and dimensions of the shield case 40. The printed-circuit board 41-1 includes relief holes 41-1-1 and 41-1-2 corresponding to the locating portions 40-26 and 40-27 of the shield case 40. The printed-circuit board 41-1 includes at its end two U-shaped cut-out portions 41-1-3 and 41-1-4 for mounting the microphone and the buzzer. The printed-circuit board 41-1 includes at the other end through holes 41-1-5 and 41-1-6, and the tapping screws 52 and 53 are inserted into the through holes 41-1-5 and 41-1-6.

Figure 10:
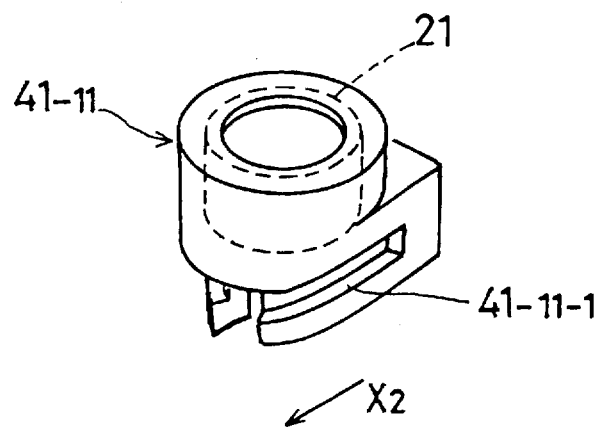
FIG. 10 is a perspective view of a microphone bushing.

A microphone bushing 41-11, shown in FIG. 10, is used to mount the microphone unit 21 on the printed-circuit board 41-1. The microphone bushing 41-11 is made of rubber. The microphone bushing 41-11 with the microphone unit 21 inserted therein is attached to the printed-circuit board 41-11 by fitting a recessed portion 41-11-1 into the U-shaped cut-out portion 41-1-3.

Figure 11:
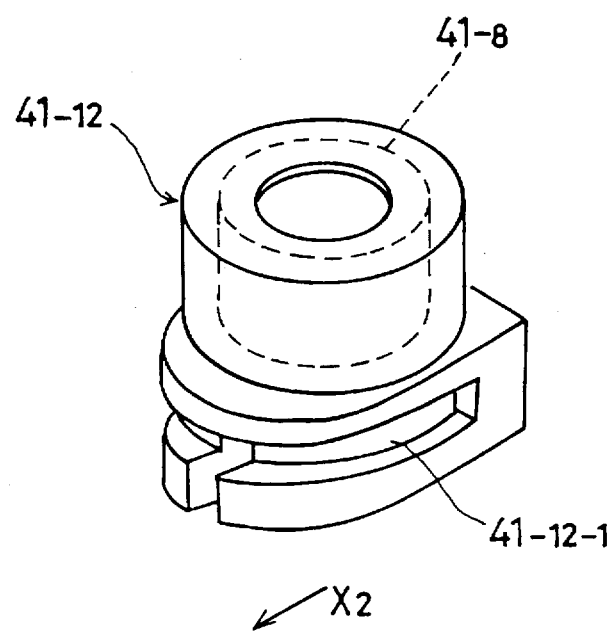
FIG. 11 is a perspective view of a buzzer bushing.

A buzzer bushing 41-12, shown in FIG. 11, is used to mount the buzzer 41-8 on the printed-circuit board 41-1. The buzzer bushing 41-12 is made of rubber. The buzzer bushing 41-12 with the buzzer 41-8 inserted therein is attached to the printed-circuit board 41-11 by fitting a recessed portion 41-12-1 into the U-shaped cut-out portion 41-1-4.

(B-4) Key-Contact Plate 42

Referring to FIGS. 4 and 6, the key-contact plate 42 is a generally rectangular sheet. The key-contact plate 42 includes a plurality of key contact portions 42-1 arrayed in a matrix formation. The key-contact plate 42 includes locating holes 42-2 and 42-3 corresponding to the above locating portions 40-26 and 40-27.

(B-5) Shield Plate 43

Referring to FIGS. 4 and 6, the shield plate 43 has a shape and dimensions which correspond to the shape and dimensions of the key contact 42. The shield plate 43 includes a plurality of holes 43-1 arrayed in a matrix formation. The shield plate 43 includes locating holes 43-2 and 43-3 corresponding to the above locating portions 40-26 and 40-27.

(B-6) Speaker Assembly 44

Referring to FIGS. 4 and 6, the speaker assembly 44 includes the speaker unit 20, a holder 44-1 for holding the speaker unit 20, and a packing 44-2 fitted to the speaker unit 20.

The holder 44-1 includes bosses 44-1-1 and 44-1-2, and bent portions 44-1-3 and 44-1-4. The bent portions 44-1-3 and 44-1-4 inwardly project from the sides of the holder 41-1 in directions indicated by arrows Y1 and Y2 in FIG. 6. The holder 44-1 is attached to the printed-circuit board 41 by connecting the bent portions 44-1-3 and 44-1-4 to the side portions of the bottom of the printed-circuit board 41 and holding the shield plate member 41-9 in the inside of the holder 44-1.

Figure 12:
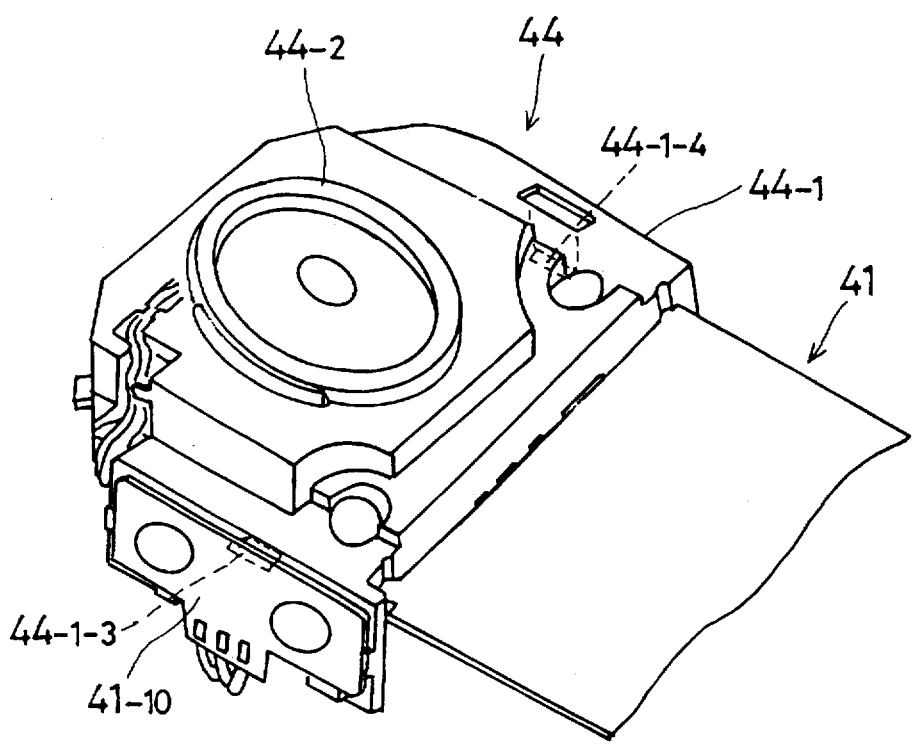
FIG. 12 is a perspective view of a printed-circuit board with a speaker assembly attached thereto.
Figure 35:
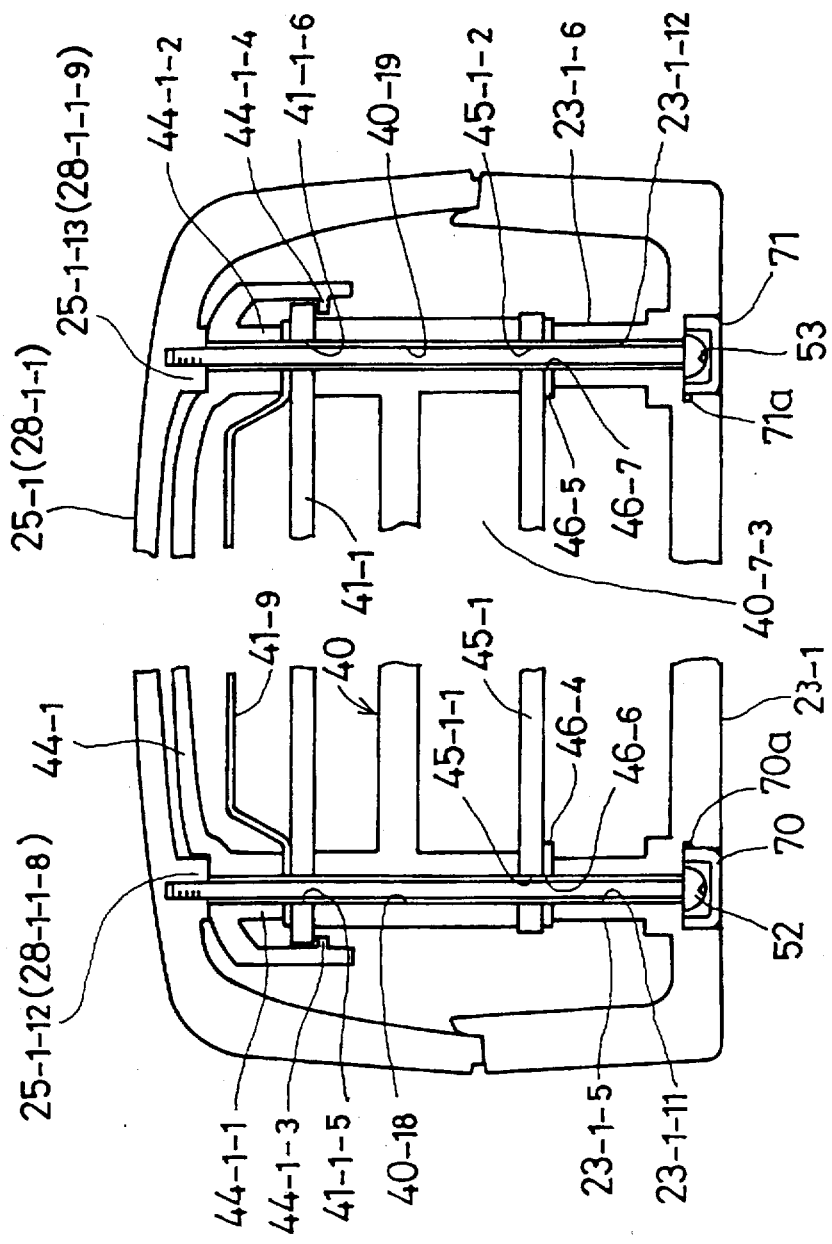
FIG. 35 is a cross-sectional view of each of the Model-1 and Model-2 portable telephones taken along a line XXXV-XXXV in FIG. 1.

Referring to FIG. 12, the speaker assembly 44 is attached to the printed-circuit board 41-1 (see FIG. 35 also). When the holder 44-1 is attached to the printed-circuit board 41-1 by the bent portions 44-1-3 and 44-1-4, the holder 44-1 is hardly detached from the printed-circuit board 41-1. In such a condition, the mounting of the speaker unit 20 on the holder 41-1 and the soldering of the volume key module 41-10 to the holder 41-1 can easily be performed by holding the printed-circuit board 41-1 only.

(B-7) Rear Printed-Circuit Board Assembly 45

Referring to FIGS. 4 and 7, on the rear printed-circuit board assembly 45, there are mounted a multi-layer printed-circuit board 45-1, an electronic part 45-2, a set of connectors 45-3 through 45-6, and an antenna-contact leaf spring 45-7.

The printed-circuit board 45-1 has a shape and dimensions which correspond to the shape and dimensions of the shield case 40. The printed-circuit board 45-1 includes through holes 45-1-1 and 45-1-2, and the tapping screws 52 and 53 are inserted in the holes 45-1-1 and 45-1-2. The printed-circuit board 45-1 includes through holes 45-1-3 and 45-1-4, and the tapping screws 54 and 55 are inserted in the holes 45-1-3 and 45-1-4.

In addition, the printed-circuit board 45-1 includes a cut-out portion 41-1-5 at a corresponding position of the corner portion 40-10 of the shield case 40.

Figure 13:
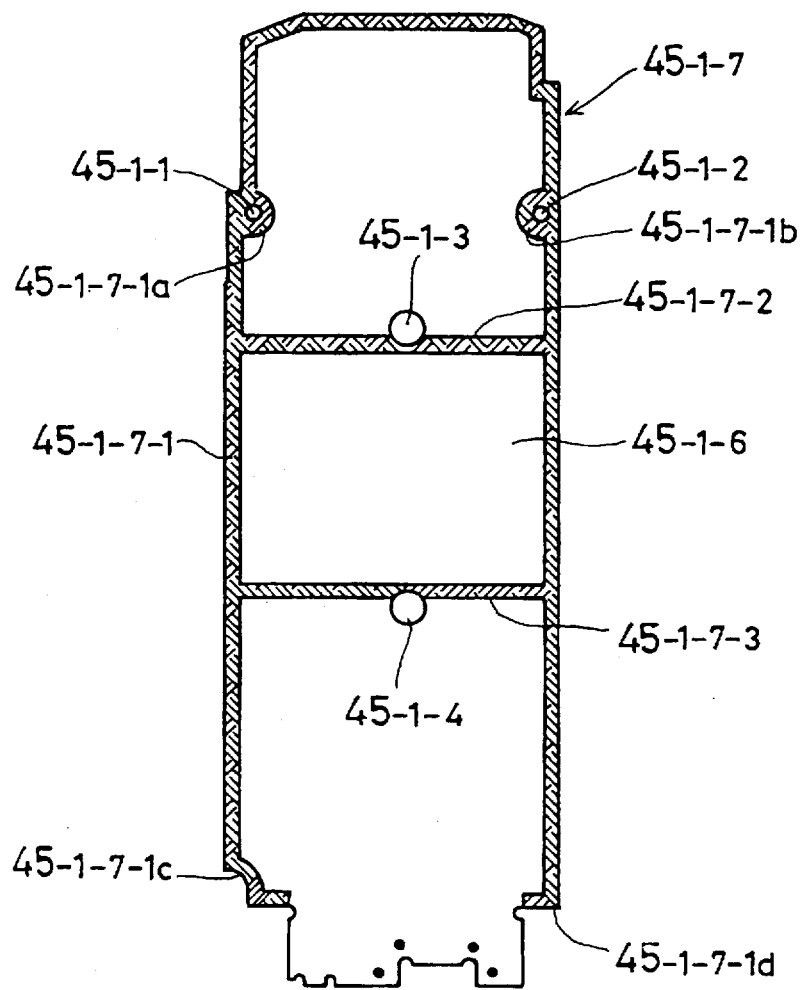
FIG. 13 is a view of an upper grounding pattern of a rear printed-circuit board.

FIG. 13 shows an upper grounding pattern 45-1-7 of the rear printed-circuit board 45-1 on the top surface 45-1-6 thereof.

The upper grounding pattern 45-1-7 has a shape and dimensions which correspond to the shape and dimensions of the recessed portions 40-3 through 40-5 of the shield case 40. The upper grounding pattern 45-1-7 includes a U-shaped peripheral pattern portion 45-1-7-1 matching the periphery of the printed-circuit board 45-2, and includes transversely extending pattern portions 45-1-7-2 and 45-1-7-3. As shown in FIG. 13, these pattern portions are continuous to each other.

The peripheral pattern portion 45-1-7-1 includes a portion 45-1-7-1a encircling the hole 45-1-1 and a portion 45-1-7-1b encircling the hole 45-1-2. The peripheral pattern portion 45-1-7-1 includes corner portions 45-1-7-1c and 45-1-7-1d.

Figure 14:
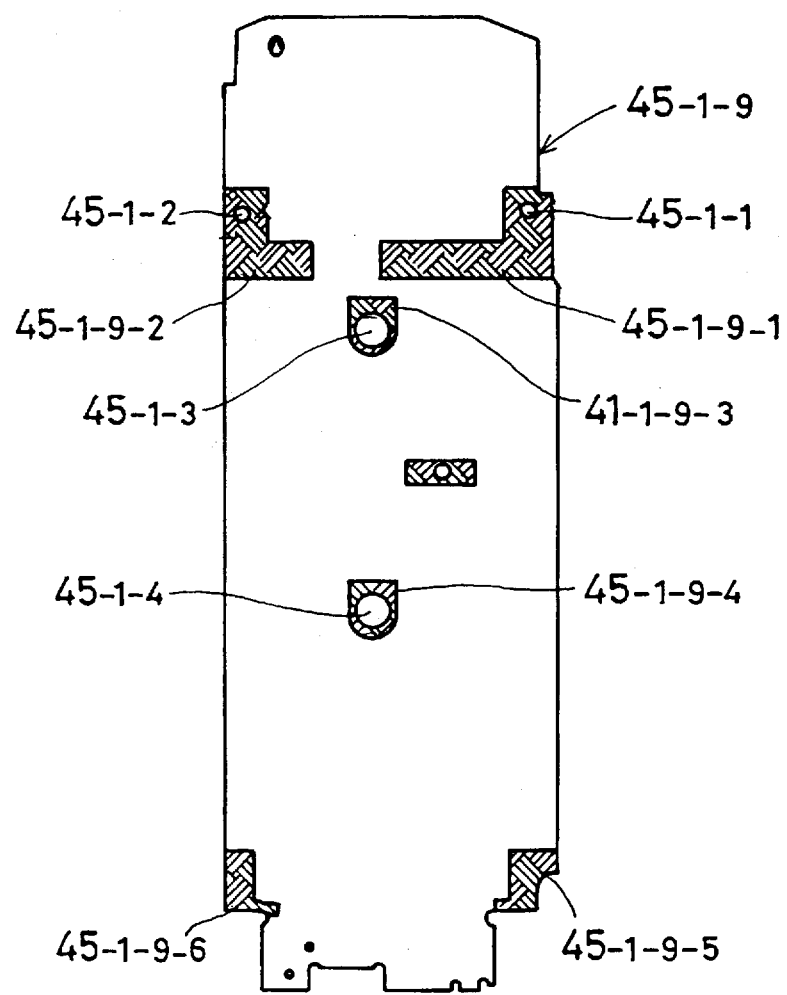
FIG. 14 is a view of a lower grounding pattern of the rear printed-circuit board.

FIG. 14 shows a lower grounding pattern 45-1-9 of the rear printed-circuit board 45-1 on the bottom surface thereof.

The lower grounding pattern 45-1-9 includes a portion 45-1-9-1 encircling the hole 45-1-1, a portion 45-1-9-2 encircling the hole 45-1-2, a portion 45-1-9-3 encircling the hole 45-1-3, a portion 45-1-9-4 encircling the hole 45-1-4, and corner portions 45-1-9-5 and 45-1-9-6.

The upper and lower grounding patterns 45-1-7 and 45-1-9 described above are electrically connected to an intermediate grounding pattern layer of the printed-circuit board 45-1.

Figure 15:
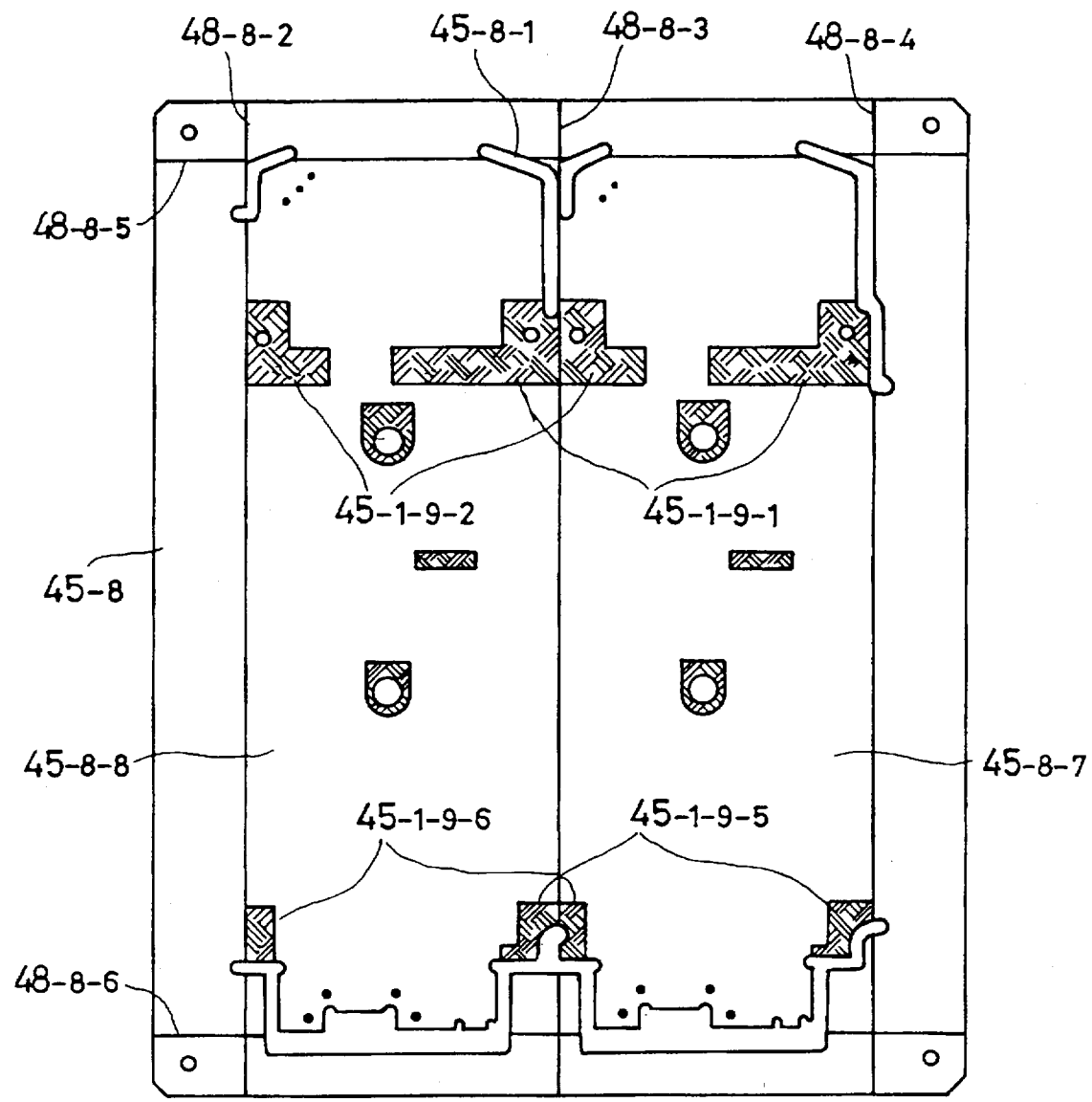
FIG. 15 is a view of the rear printed-circuit board for explaining a two-board simultaneous production thereof.

Referring to FIG. 15, a two-board simultaneous production of the rear printed-circuit board 45-1 will be explained. Two printed-circuit boards 45-1 are produced from a printed-circuit board 45-8 shown in FIG. 15. In FIG. 15, a bottom surface of the printed-circuit board 45-8 is shown.

The printed-circuit board 45-8 includes slits 45-8-1, and five straight V-grooves 45-8-2 through 45-8-6. The printed-circuit board 45-8 is cut along the respective V-grooves, so that two portions 45-8-7 and 45-8-8 are formed into two pieces of the printed-circuit boards 45-1.

As shown in FIG. 7, each of the printed-circuit boards 45-1 which are thus produced includes side edges 45-1-10 and 45-1-11 which extend in directions indicated by arrows X1 and X2.

Therefore, the commonality of the printed-circuit boards 45-1 enables the cost of the manufacture to be reduced.

Since the printed-circuit board 45-1 has no portions outwardly projecting from the side portions 45-1-10 and 45-1-11, the tightening force to secure the printed-circuit board 45-1 and the shield case 40 is not high, and, in the above embodiment, the shielding effect of the printed-circuit board 45-1 and the shield case 40 is reduced. Thus, the shielding effect of the printed-circuit board 45-1 and the shield case 40 must be increased by some improvement. This will be described below.

Figure 16:
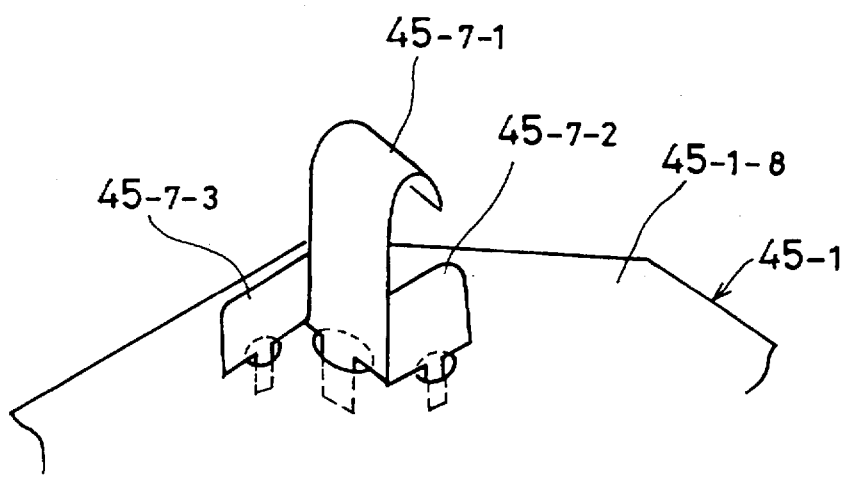
FIG. 16 is a diagram showing an antenna-contact leaf spring attached to the rear printed-circuit board.

FIG. 16 shows an antenna-contact leaf spring 45-7 attached to the rear printed-circuit board 45-1. The antenna-contact leaf spring 45-7 includes a U-shaped leaf spring portion 45-7-1, and holding portions 45-7-2 and 45-7-3 on both sides of the leaf spring portion 45-7-1.

The leaf spring portion 45-7-1 is fixed to the bottom surface 45-1-8 of the printed-circuit board 45-1 by soldering.

When the body assembly 22 is enclosed in the case assembly 26 (or 29), the leaf spring portion 45-7-1 is fitted to the antenna power-supply plate 23-2-4 to make an electrical connection of the antenna assembly and the printed-circuit board 45-1. See FIG. 22.

(B-8) Shield Plate 46

Referring to FIGS. 4 and 7, the shield plate 46 includes a first lid portion 46-1, a second lid portion 46-2, a connecting portion 46-3, and a pair of bent portions 46-4 and 46-5. The first and second lid portions 46-1 and 46-2 are interconnected by the connecting portion 46-3.

The bent portions 46-4 and 46-5 include holes 46-6 and 46-7, and the tapping screws 52 and 53 are inserted in the holes 46-6 and 46-7.

The first lid portion 46-1 includes an inserting portion 46-8. The second lid portion 46-2 includes projections 46-9 and 46-10, cut-out portions 46-11 and 46-12, and bent portions 46-15 and 46-16. The projections 46-9 and 46-10 include holes 46-13 and 46-14, and the tapping screws 54 and 55 are inserted in the holes 46-13 and 46-14.

The cut-out portions 46-11 and 46-12 are located on the sides (indicated by the arrows Y1 and Y2) of the second lid portion 46-2. The bent portions 46-15 and 46-16 are located on one end (indicated by the arrow X1) of the second lid portion 46-2.

(C) REAR CASE ASSEMBLY 23

Figure 17:
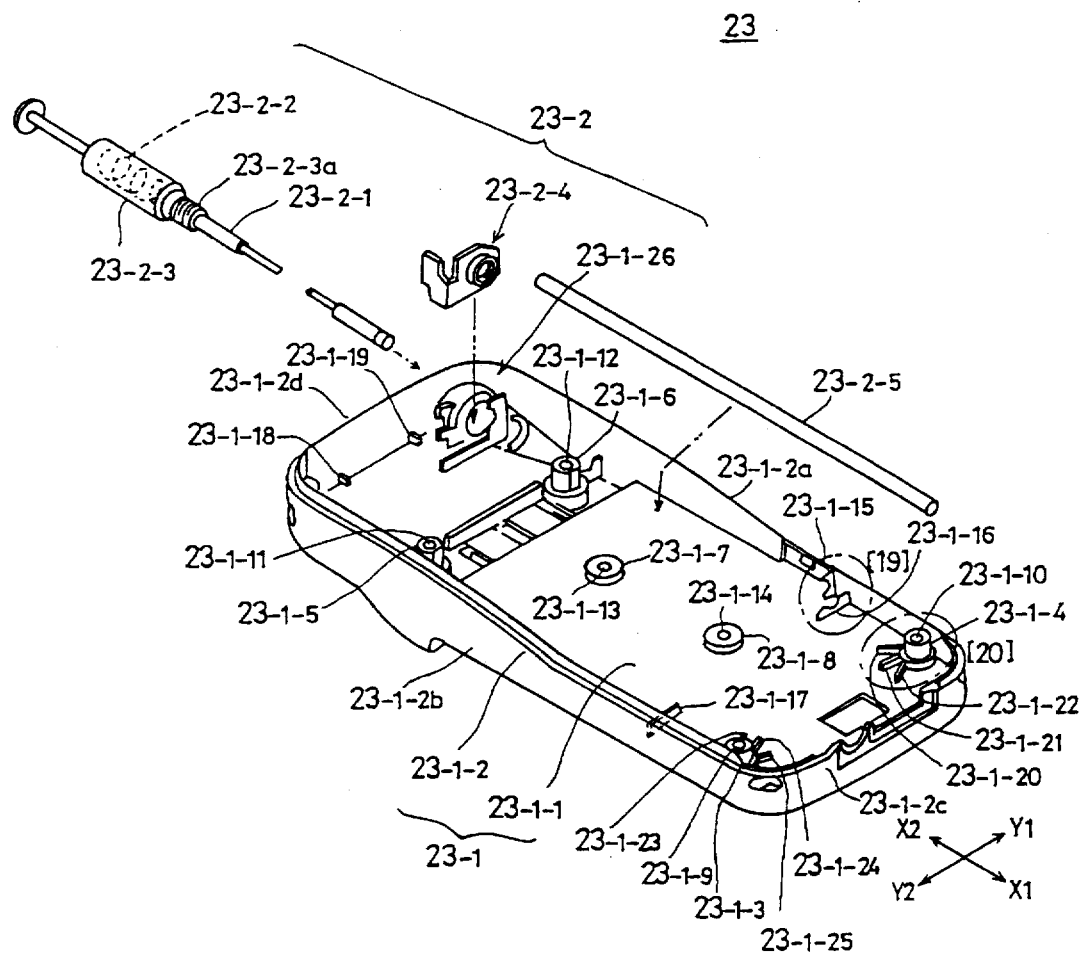
FIG. 17 is an exploded view of a rear case assembly.
Figure 18:
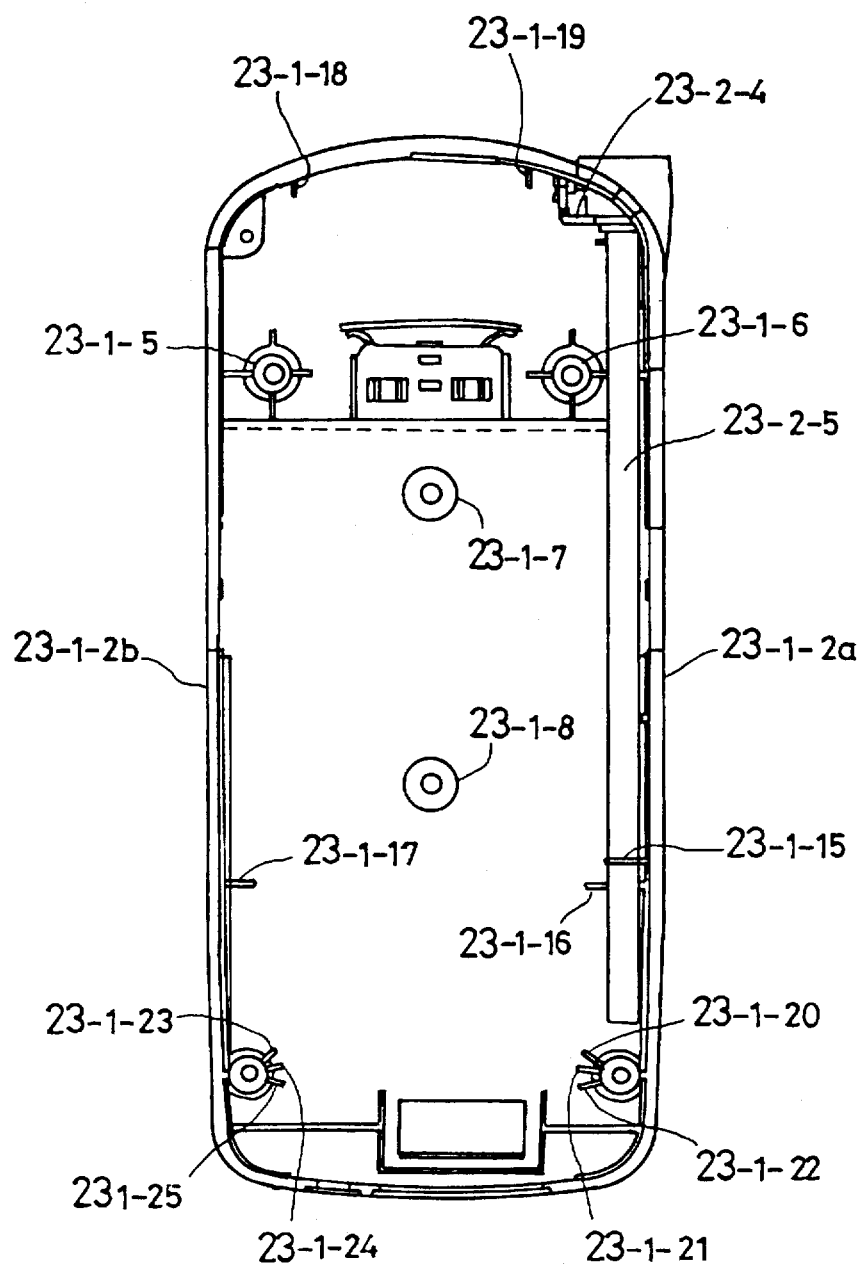
FIG. 18 is a top view of the rear case assembly in FIG. 17.

Referring to FIGS. 1, 17 and 18, the rear case assembly 23 includes a rear case member 23-1 which is made of a molding of a synthetic resin, and an antenna assembly 23-2 which is enclosed in the rear case member 23-1.

(C-1) Rear Case Member 23-1

As shown in FIGS. 17 and 18, the rear 10 case member 23-1 includes a bottom portion 23-1-1 and a peripheral wall portion 23-1-2. The peripheral wall portion 23-1-2 is comprised of four wall portions 23-1-2a through 23-1-2d.

The rear case member 23-1 includes bosses 23-1-3 through 23-1-8. The bosses 23-1-3 and 23-1-4, and the bosses 23-1-5, 23-1-6, 23-1-7 and 23-1-8 are respectively located at the corner portions 4-10 and 4-11 of the shield case 40, and at the bosses 40-14, 40-15, 40-16 and 40-17 of the shield case 40. The bosses 23-1-3 through 23-1-8 include through holes 23-1-9 through 23-1-14, and tapping screws 50 through 55 are inserted in the through holes 23-1-9 through 23-1-14.

Figure 19:
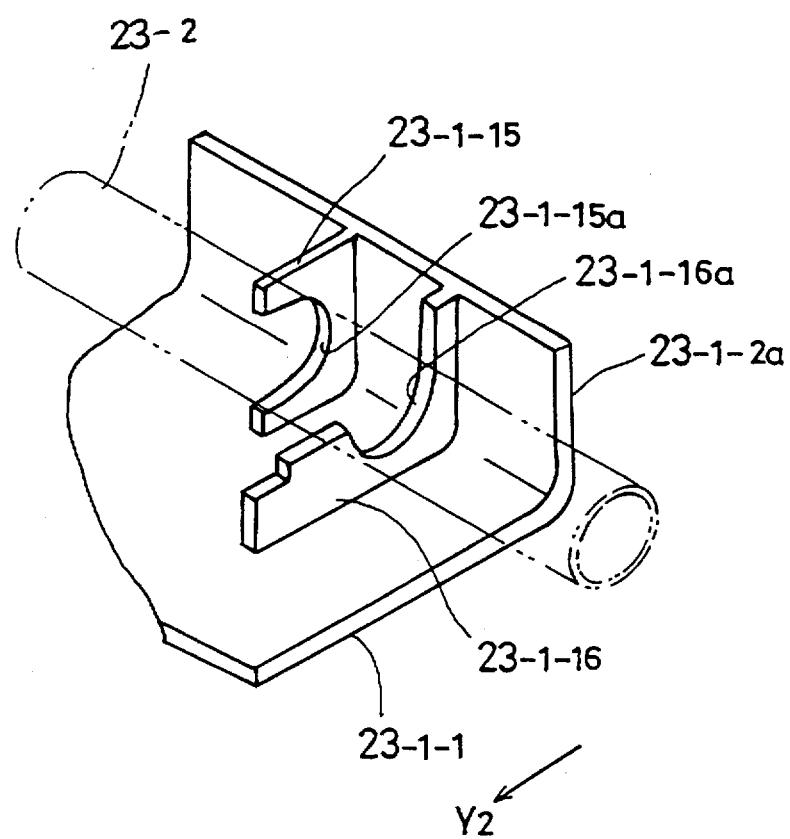
FIG. 19 is an enlarged view of a portion of the rear case assembly which is indicated by a circle in FIG. 17.

In addition, the rear case member 23-1 includes a plurality of ribs 23-1-15 through 23-1-25. FIG. 19 is an enlarged view of a portion of the rear case assembly 23 indicated by a circle [19] in FIG. 17. As shown in FIGS. 17 and 19, the ribs 23-1-15 and 23-1-16 are located in the vicinity of the boss 23-1-8 of the wall portion 23-1-2a, and these ribs inwardly extend in the direction Y2 from the wall portion 23-1-2a.

The rib 23-1-17 inwardly extends in the direction Y1 from the wall portion 23-1-2b. The ribs 23-1-16 and 23-1-17 are opposed to each other.

The ribs 23-1-18 and 23-1-19 inwardly project from the wall portion 23-1-2d in the direction X1.

Figure 20:
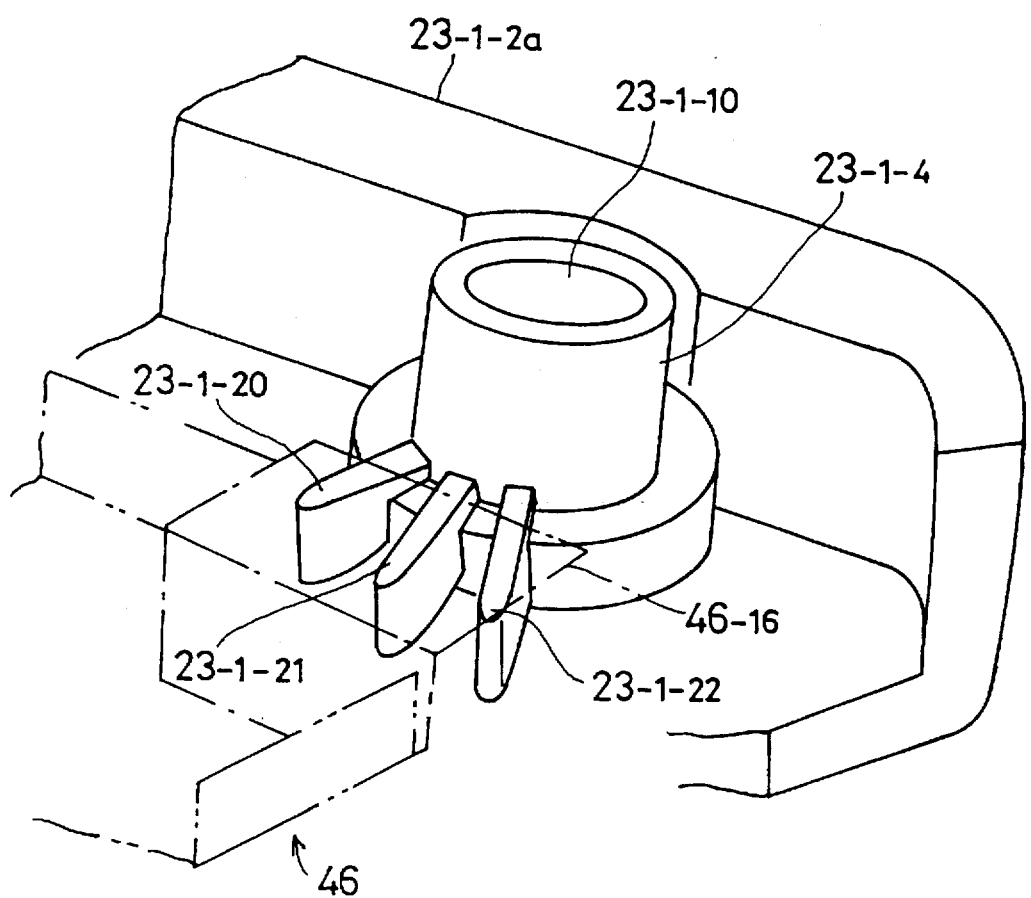
FIG. 20 is an enlarged view of another portion of the rear case assembly which is indicated by another circle in FIG. 17.

FIG. 20 is an enlarged view of a portion of the rear case assembly 23 indicated by a circle [20] in FIG. 17. As shown in FIGS. 17 and 20, the ribs 23-1-20, 23-1-21, and 23-1-22 radially project from the boss 23-1-4 toward the inside of the rear case member 23-1.

Similarly, the ribs 23-1-23, 23-1-24, 23-1-25 radially project from the boss 23-1-3 toward the inside of the rear case member 23-1.

The above-described ribs 23-1-16 through 23-1-25 are used to attach the rear printed-circuit board 45-1 and the shield plate 46.

In addition, as shown in FIG. 19, the ribs 23-1-15 and 23-1-16 are formed with U-shaped cut-out portions 23-1-15a and 23-1-16a, and these cut-out portions are used to attach the antenna assembly 23-2.

The rear case member 23-1 includes a portion 23-1-26 for attaching the antenna power-supply plate 23-2-4.

Figure 21:
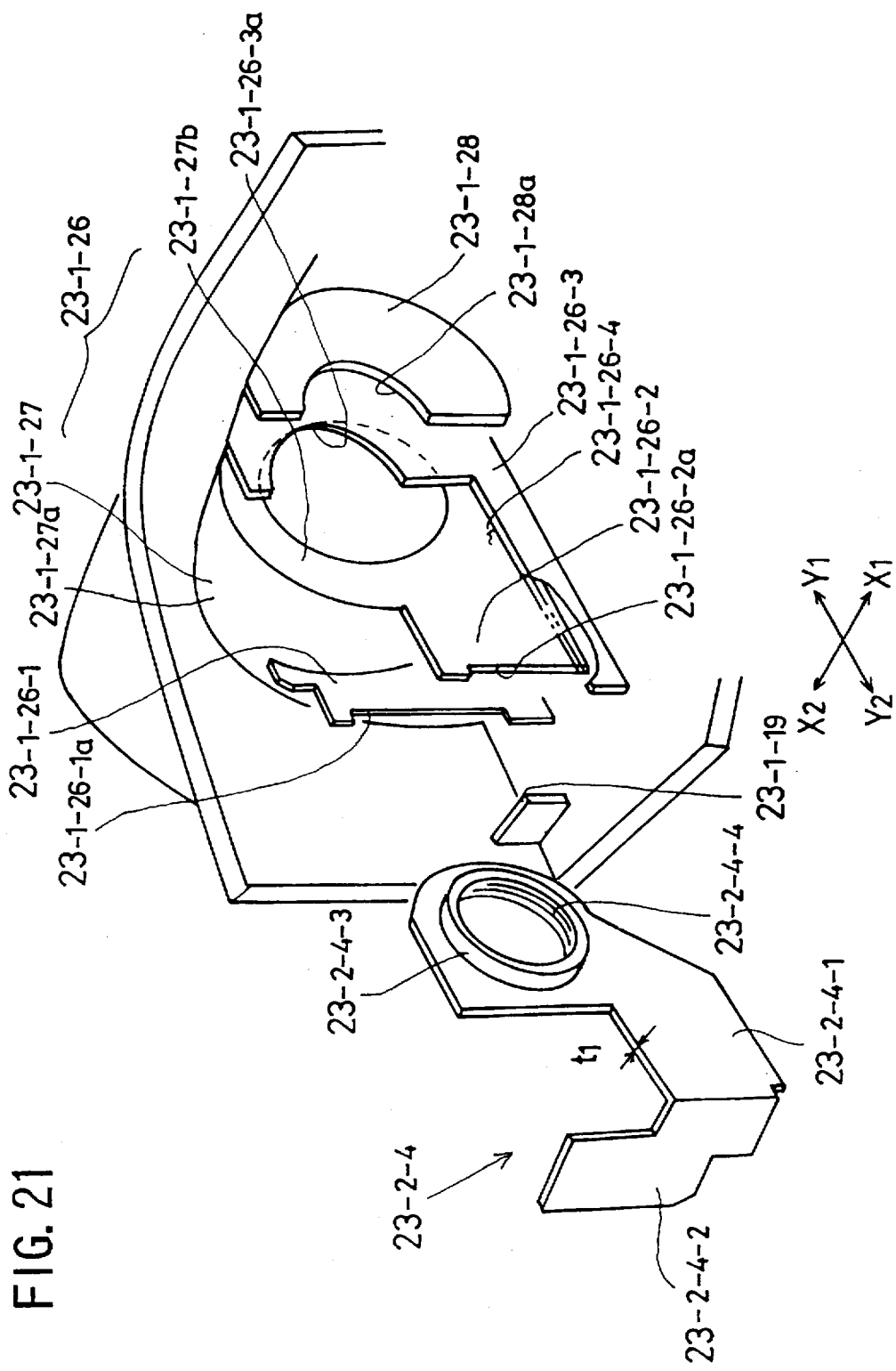
FIG. 21 is a perspective view of an antenna power-supply plate and a portion of the rear case assembly for attaching the antenna power-supply plate.
Figure 22:
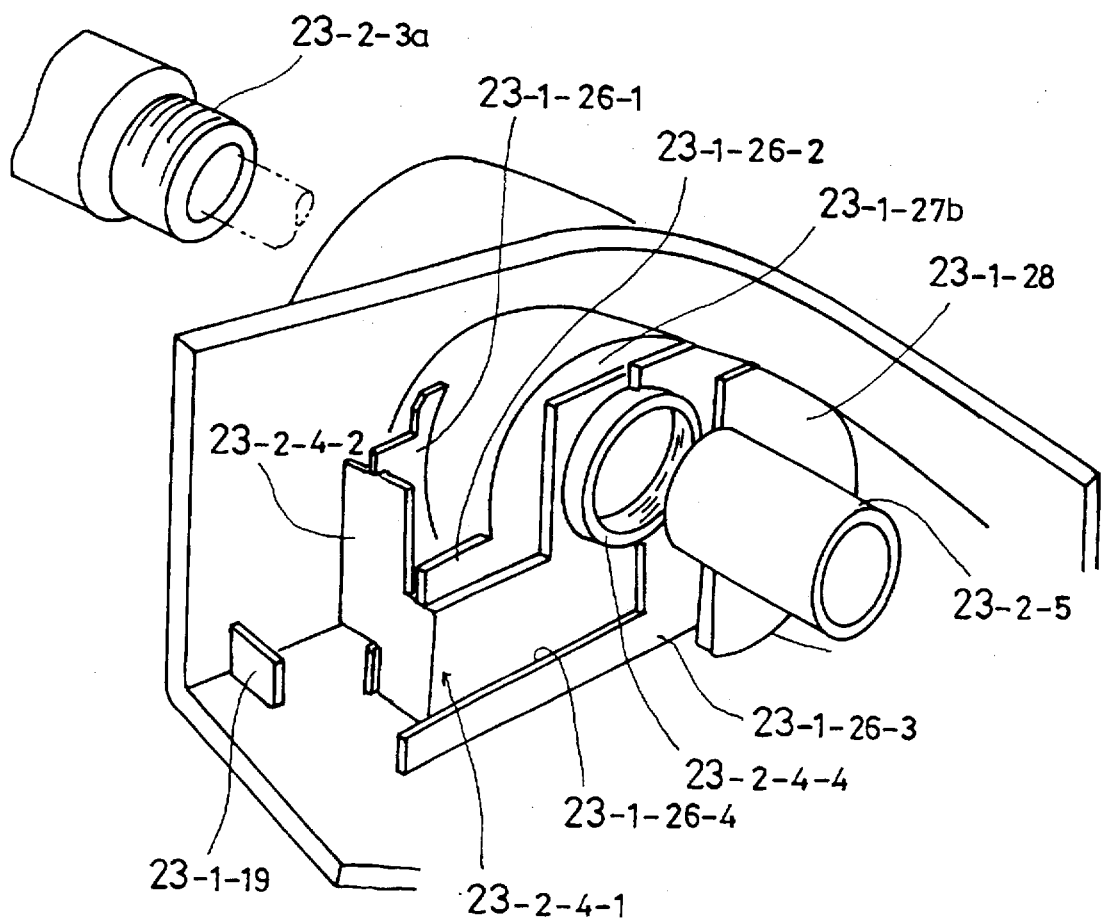
FIG. 22 is a perspective view of the portion of the rear case assembly to which the antenna power-supply plate is attached.

FIGS. 21 and 22 show the antenna power-supply plate 23-2-4 and the portion 23-1-26 for attaching the antenna power-supply plate 23-2-4.

As shown in FIG. 21, the portion 23-1-26 includes three ribs 23-1-26-1, 23-1-26-2 and 23-1-26-3. The rib 23-1-26-1 inwardly extends from the wall portion 23-1-27a near the boss 23-1-27 in the direction Y2. The rib 23-1-26-1 includes a cut-out portion 23-1-26-1a at the leading edge.

The rib 23-1-26-2 inwardly extends from an end surface 23-1-27b of the boss 23-1-27 in the direction Y2, and it includes a cut-out portion 23-1-26-2a at the leading edge.

The rib 23-1-26-3 inwardly extends in parallel with the rib 23-1-26-2, and it includes a U-shaped cut-out portion 23-1-26-3a. The U-shaped cut-out portion 23-1-26-3a corresponds to a burring portion 23-2-4-3 of the antenna power-supply plate 23-2-4. There is a clearance 23-1-26-4 between the ribs 23-1-26-2 and 23-1-26-3, and this clearance 23-1-26-4 corresponds to a thickness (t1) of the antenna power-supply plate 23-2-4.

The rib 23-1-27 is provided at a corner of the rear case member 23-1, and the rib 23-1-27 is used to fit the antenna cylinder 23-2-3 of the antenna assembly 23-2.

(C-2) Antenna Assembly 23-2

Referring to FIG. 17, the antenna assembly 23-2 includes a rod antenna 23-2-1, a helical coil antenna 23-2-2, the antenna cylinder 23-2-3 including the helical coil antenna 23-2-2, the antenna power-supply plate 23-2-4, and an antenna pipe 23-2-5 including the rod antenna 23-2-1.

The antenna cylinder 23-2-3 includes a threaded portion 23-2-3a at the leading edge.

The rod antenna 23-2-1 is slidable relative to the antenna cylinder 23-2-3 in the directions X1 and X2.

The antenna power-supply plate 23-2-4 is a part used instead of an antenna power-supply insert of a conventional portable telephone. The antenna power-supply plate 23-2-4 can be produced through a sheet metal processing, and the cost of the manufacture is reduced to be lower than the cost of the manufacture of the conventional part.

As shown in FIG. 21, the antenna power-supply plate 23-2-4 includes a plate portion 23-2-4-1 extending in the direction Y1, a flange portion 23-2-4-2 extending in the direction X2, the burring portion 23-2-4-3 at one end of the plate portion 23-2-4-1, and a threaded portion 23-2-4-4 on the inside wall of the burring portion 23-2-4-3.

The antenna power-supply plate 23-2-4 can be easily attached to the rear case assembly 23 by inserting it into the clearance 23-2-4-4 toward the direction Y1 from the condition shown in FIG. 21.

The antenna power-supply plate 23-2-4, when attached to the rear case assembly 23 (FIG. 22), is in the condition that the plate portion 23-2-4-1 is fitted between the ribs 23-1-26-2 and 23-1-26-3, the flange portion 23-2-4-2 is fitted to the cut-out portions 23-1-26-1a and 23-1-26-2a, and the burring portion 23-2-4-3 is fitted to the cut-out portion 23-1-26-3a.

Figure 23:
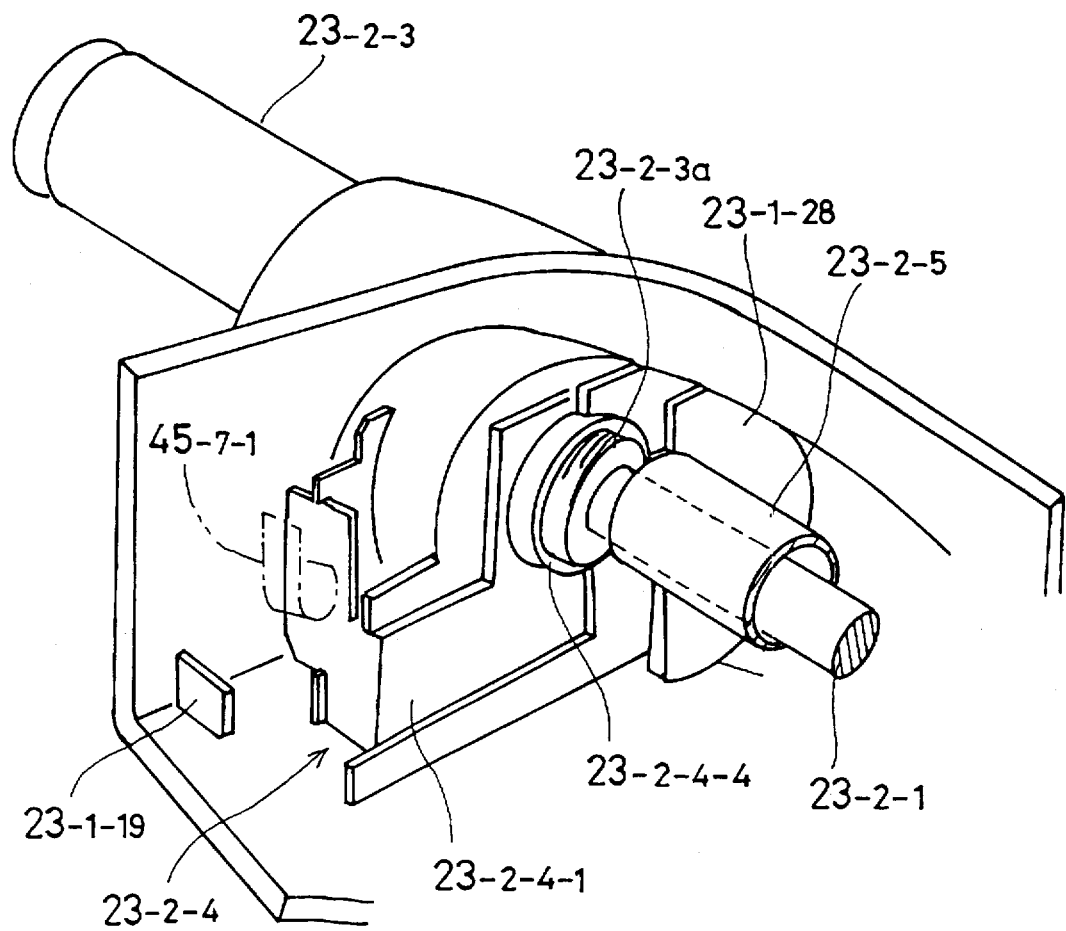
FIG. 23 is a perspective view of the portion of the rear case assembly to which an antenna cylinder is further attached.
Figure 24:
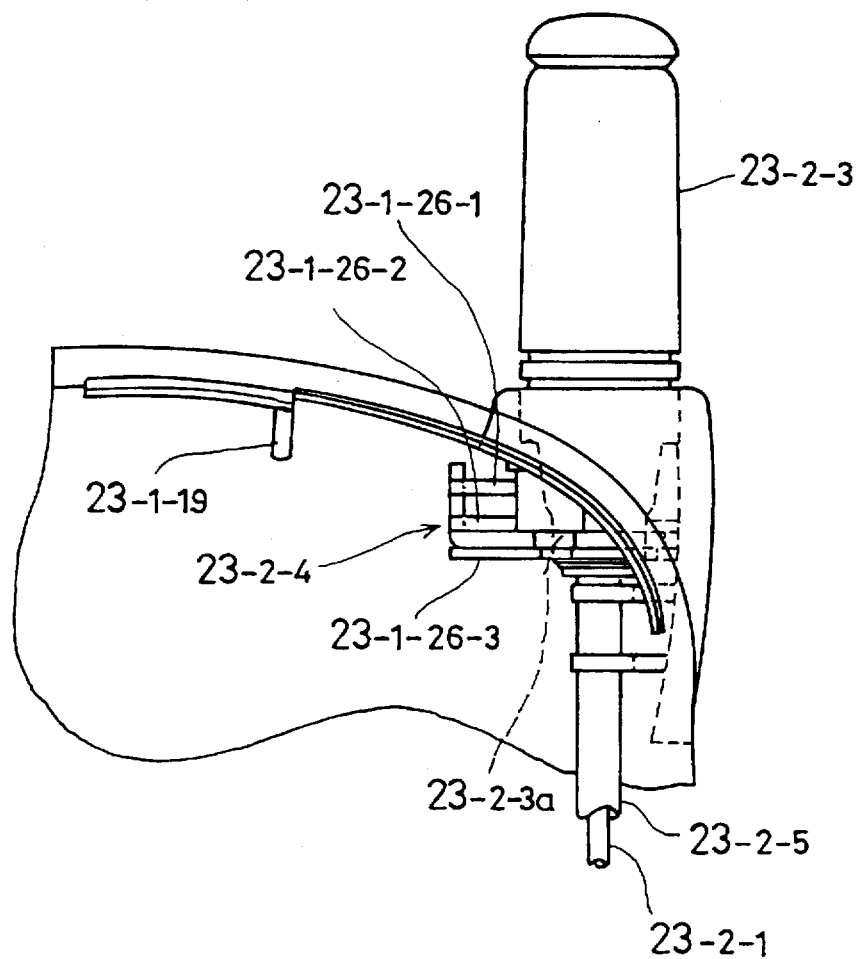
FIG. 24 is a top view of the portion of the rear case assembly in FIG. 23.

The antenna assembly 23-2 is attached to the rear case assembly 23 as shown in FIGS. 23 and 24. In the attached condition, the antenna cylinder 23-2-3 is fitted to the boss 23-1-27, and the threaded portion 23-2-3a is fitted to the threaded portion 23-2-4-4 of the antenna power-supply plate 23-2-4. The rod antenna 23-2-1 is inserted in the antenna pipe 23-2-5. An end portion of the antenna pipe 23-2-5 is fitted to the cut-out portion 23-1-28a of the rib 23-1-28.

When the body assembly 22 and the rear case assembly 23 are attached, the leaf spring portion 45-7-1 of the leaf spring member 45-7 is fitted into the plate portion 23-2-4-1 of the antenna power-supply plate 23-2-4 as indicated by a phantom line in FIG. 23.

In addition, when the body assembly 22 and the rear case assembly 23 are attached, the helical coil antenna 23-2-2, the antenna power-supply plate 23-2-4, and the leaf spring member 45-7 are electrically connected to an antenna circuit of the printed-circuit board 45-1.

When the rod antenna 23-2-1 is fully inserted, the end of the rod antenna 23-2-1 is brought into contact with the antenna cylinder 23-2-3. The rod antenna 23-2-1, the antenna power-supply plate 23-2-3, and the leaf spring member 45-7 are electrically connected to the antenna circuit of the printed-circuit board 45-1.

(D) FRONT CASE ASSEMBLY 25 OF MODEL-1 PORTABLE TELEPHONE

Figure 25:
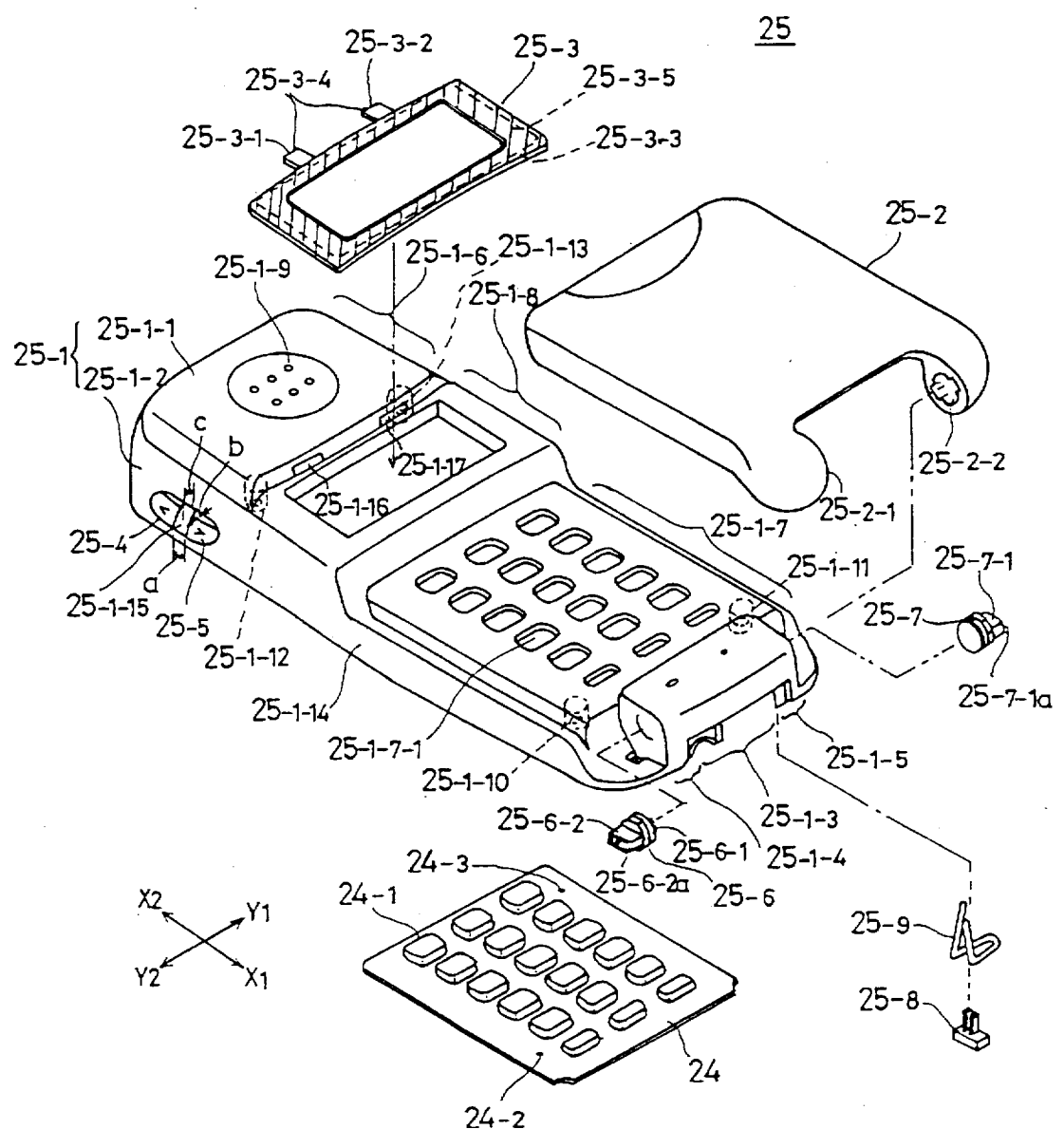
FIG. 25 is an exploded view of a front case assembly of the Model-1 portable telephone.

FIG. 25 shows the front case assembly 25 of the Model-1 portable telephone 11. The front case assembly 25 includes a front case member 25-1, a lid member 25-2, and a LCD window member 25-3.

(D-1) Front Case Member 25-1

The front case member 25-1 includes a top plate 25-1-1 and a peripheral wall portion 25-1-2.

In addition, the front case member 25-1 includes a microphone case portion 25-1-3 and a speaker case portion 25-1-6. A ten key case portion 25-1-7 near the microphone case portion 25-1-3 and a window frame portion 25-1-8 near the speaker case portion 25-1-6 are also provided.

The speaker case portion 25-1-6 includes a plurality of small holes 25-1-9 which are arrayed in two rows.

The top plate 25-1-1 includes four bosses 25-1-10 through 25-1-13 having through holes at four corners. The bosses 25-1-10 through 25-1-13 are arranged such that they correspond to the bosses 23-1-3 through 23-1-6 of the rear case member 23-1 shown in FIG. 17.

Taking into account the relationship between the front case assembly 25 and the body assembly 22 (shown in FIG. 6), the bosses 25-1-10 and 25-1-11 correspond to the corner portions 40-10 and 40-11, and the bosses 25-1-12 and 25-1-13 correspond to the bosses 44-1-1 and 44-1-2 of the holder 44-1.

In addition, the front case member 25-1 includes a projection 25-1-15 at an end portion of the peripheral wall portion 25-1-14.

(D-2) Other Parts Attached to Front Case Member 25-1

On a side portion 25-1-14 of the front case member 25-1, there are provided a volume key 25-4 used by an operator to increase the volume of the speaker unit 20 by depressing the volume key 25-4, and a volume key 25-5 used to decrease the volume of the speaker unit 20 by depressing the volume key 25-5.

The volume keys 25-4 and 25-5 are separated from each other along the direction X1 or X2 by a distance indicated by an arrow "a" in FIG. 25.

To facilitate the depressing operation of the operator, the volume keys 25-4 and 25-5 outwardly project from the side portion 25-1-14 by a height indicated by an arrow "b" in FIG. 25.

The projection 25-1-15 is arranged between the volume keys 25-4 and 25-5 on the side portion 25-1-14, and it outwardly projects from the side portion 25-1-14 by a height indicated by an arrow "c" in FIG. 25. This height "c" is substantially the same as the above-mentioned height "b". The projection 25-1-15 serves to prevent an erroneous depression of the volume keys 25-4 and 25-5.

Figure 27:
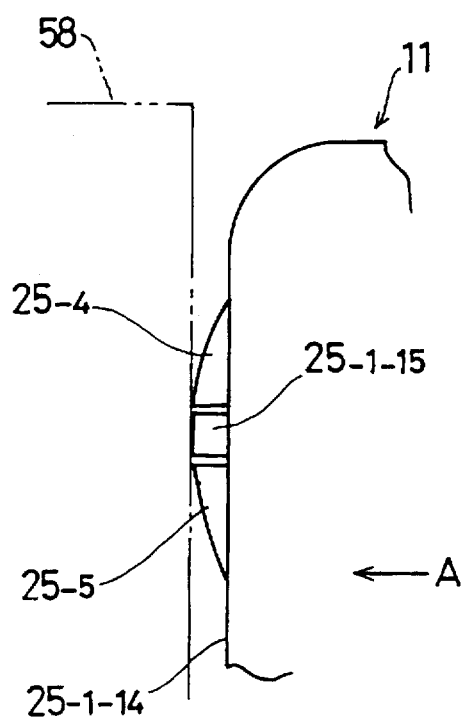
FIG. 27 is a diagram for explaining an erroneous operation prevention of a volume key module.

As shown in FIG. 27, when the Model-1 portable telephone 11 during the use thereof hits an external object 58, the projection 25-1-15 is first brought into contact with the external object 58. Thus, the projection 25-1-15 prevents the erroneous depression of the volume keys 25-4 and 25-5 due to the contact of the portable telephone 11 with the external object 58.

Figure 26:
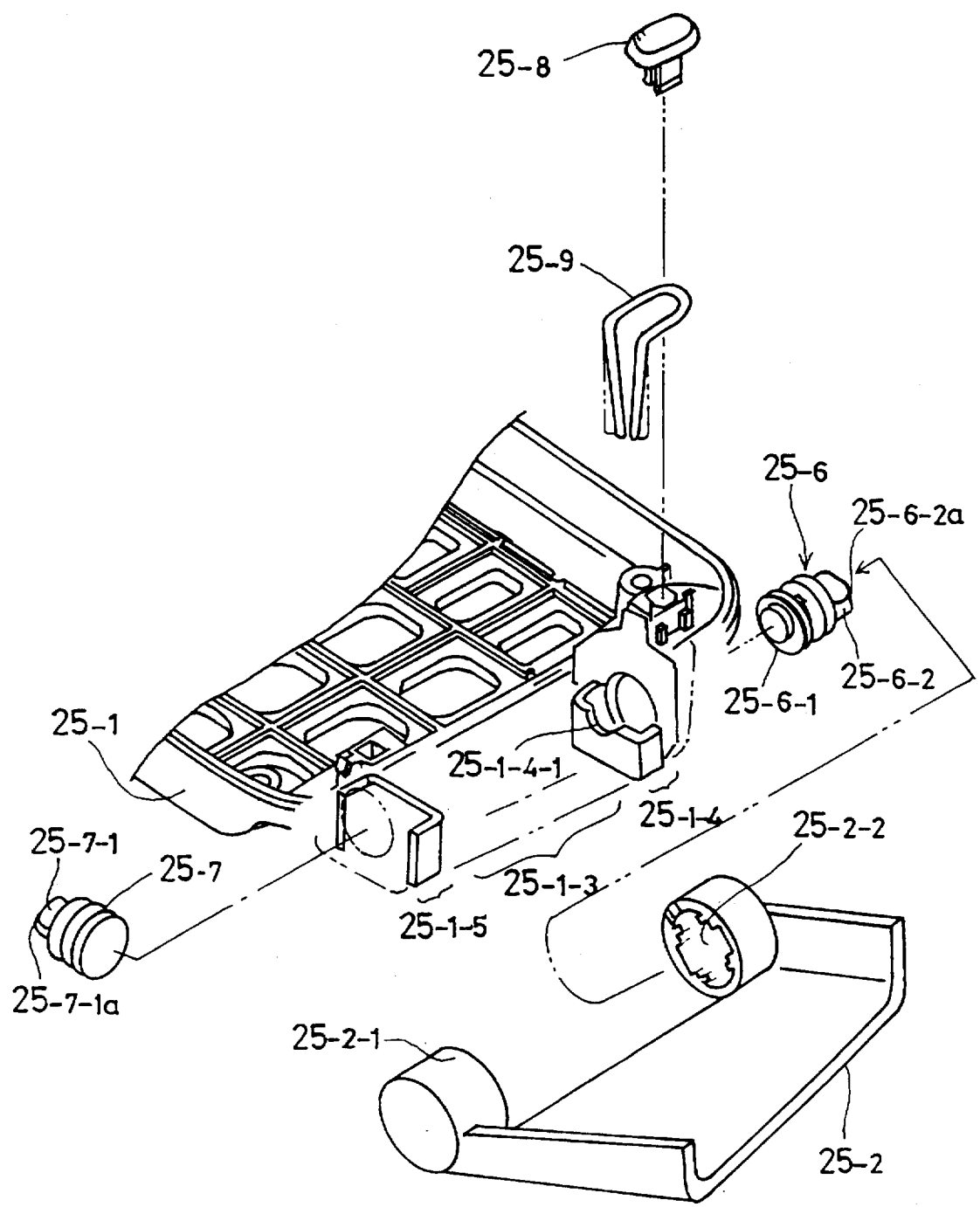
FIG. 26 is an exploded view of a portion of the front case assembly which supports a lid.

Referring to FIG. 26, a shaft member 25-6 is inserted in a supporting portion 25-1-4, and a spring member 25-9 held by a cap member 25-8 is fitted to the shaft member 25-6. Similarly to the above shaft member 25-6, another shaft member 25-7 is inserted in another supporting portion 25-1-5.

In the above embodiment, the shaft members 25-6 and 25-7 are separate parts. In order to differentiate these shaft members from each other during the assembly operation, only the shaft member 25-6 is formed with a circular projection 25-6-1 at an end surface of the shaft member 25-6. The shaft member 25-7 is formed with no corresponding projection at an end portion of the shaft member 25-7. The supporting portion 25-1-4 is formed with a cut-out portion 25-1-4-1, and the supporting portion 25-1-5 is formed with no corresponding cut-out portion. Therefore, it is possible to prevent the shaft member 25-6 from being erroneously inserted in the supporting portion 25-1-5. Also, it is possible to prevent the shaft member 25-7 from being erroneously inserted in the supporting portion 25-1-4.

Accordingly, in the above embodiment, the shaft members 25-6 and 25-7 allow the assembly operations of the Model-1 portable telephone 11 to be efficiently carried out.

Further, the shaft member 25-6 is formed with a portion 25-6-2 which outwardly projects from the supporting portion 25-1-4, and the shaft member 25-7 is formed with a portion 25-7-1 which outwardly projects from the supporting portion 25-1-5. The portions 25-6-2 and 25-7-1 have a rectangular cross section. The portions 25-6-2 and 25-7-1 have at their corners rounded portions 25-6-2a and 25-7-1a. This facilitates the attaching of the lid 25-2 to the front case assembly 25.

(D-3) Lid Member 25-2

Referring to FIGS. 25 and 26, the lid 25-2 includes a pair of connecting portions 25-2-1 and 25-2-2. The lid member 25-2 is attached to the front case assembly 25 by connecting the connecting portions 25-2-1 and 25-2-2 to the shaft members 25-6-2 and 25-7-1. Since the portions 255-6-2 and 25-7-1 have the rounded portions 25-6-2a and 25-7-1a, the lid member 25-2 is easily attached to the front case assembly 25.

When the portable telephone 11 is not used, the lid member 25-2 is closed to cover the ten key case portion 25-1-7. When the portable telephone 11 is used, the lid member 25-2 is opened to uncover the ten key case portion 25-1-7.

(D-4) LCD Window Member 25-3

Referring to FIG. 25, the LCD window member 25-3 is a resin-molded part which is transparent. The LCD window member 25-3 includes a pair of projections 25-3-1 and 25-3-2. A peripheral portion of the bottom of the LCD window member 25-3 is screen printed in black, and the screen-printed area is indicated by shading lines in FIG. 25. The cost of the screen printing of the LCD window member 25-3 is relatively low. The bottom of the LCD window member 25-3 is flat, and the screen printing thereof can be easily carried out.

The resin-molded part inherently has traces 25-3-4 of gates of a mold which is used in the resin molding, and the gates are the inlets from which the resin material is injected to the mold. In the above embodiment, the gates of the mold of the LCD window member 25-3 are arranged such that the traces 25-3-4 of the gates are located at positions overlapping the projections 25-3-1 and 25-3-2.

The LCD window member 25-3 is attached to the front case member 25-1 by inserting the projections 25-3-1 and 25-3-2 into slits of the front case member 25-1. After locating the LCD window member 25-3 next to the front case member 25-1, the LCD window member 25-3 is attached to the window frame portion 25-1-8 by using a double-sided adhesive tape 25-3-5. As the projections 25-3-1 and 25-3-2 are located beneath the front case member 25-1, the traces 25-3-4 are concealed by the front case member 25-1 and do not appear on the outside.

(D-5) Keypad 24

Referring to FIG. 25, the keypad 24 includes a plurality of key portions 24-1 which are arrayed in rows and columns. The key portions 24-1 are marked by the numerals, the characters and the signs corresponding to the functions of the Model-1 portable telephone 11.

The keypad 24 includes locating holes 24-2 and 24-3 which correspond to the locating holes 42-2 and 42-3 of the key contact plate 42 in FIG. 6. The keypad 24 is placed on the bottom of the ten key case portion 25-1-7, and the key portions 24-1 slightly project from respective ten key holes 25-1-7-1 of the ten key case portion 25-1-7.

(E) FRONT CASE ASSEMBLY 28 OF MODEL-2 PORTABLE TELEPHONE

Figure 28:
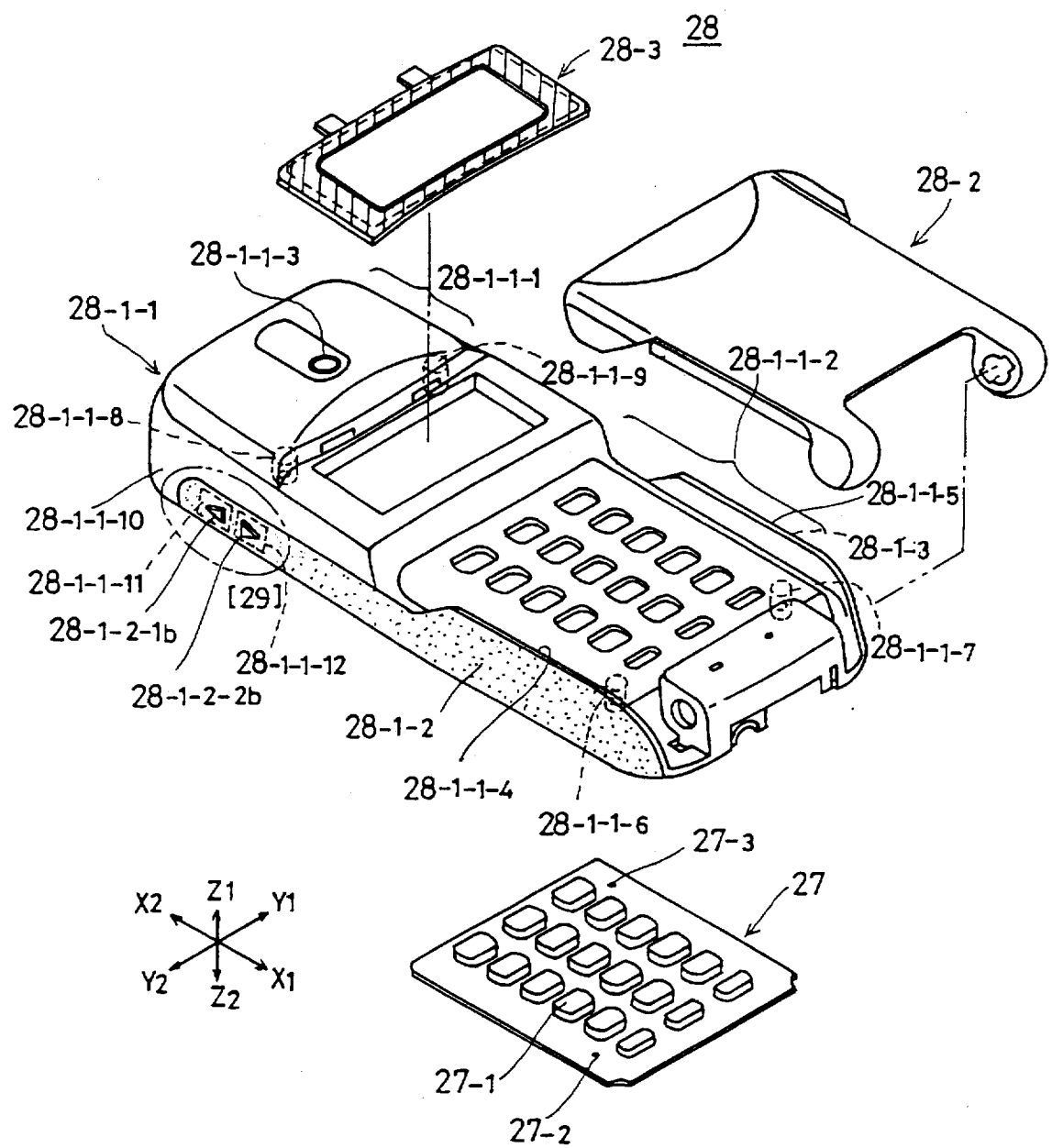
FIG. 28 is an exploded view of a front case assembly of the Model-2 portable telephone.

FIG. 28 shows the front case assembly 28 of the Model-2 portable telephone 12. As shown in FIG. 28, the front case assembly 28 is substantially the same as the front case assembly 25 in FIG. 25. The front case assembly 28 includes a front case member 28-1, a lid member 28-2, and a LCD window member 28-3.

The lid member 28-2 and the LCD window member are the same as the lid member 25-2 and the LCD window member 25-3 in FIG. 25, and a description thereof will be omitted.

(E-1) Front Case Member 28-1

Referring to FIG. 28, the front case member 28-1 includes side cover portions 28-1-2 and 28-1-3 on side surfaces of the front case member 28-1. The front case member 28-1 includes a speaker case portion 28-1-1-1 and a ten key case portion 28-1-1-2, and the other portions thereof are the same as those corresponding portions of the front case member 25-1 in FIG. 25.

The speaker case portion 28-1-1-1 includes a relatively large opening 28-1-1-3.

The ten key case portion 28-1-1-2 includes raised portions 28-1-1-4 and 28-1-1-5 projecting from sides of the ten key case portion 28-1-1-2.

The front case member 28-1 includes four bosses 28-1-1-6 through 28-1-1-9 at four corners of the front case member 28-1, and the bosses 28-1-1-6 through 28-1-1-9 have through holes. The locations of the bosses 28-1-1-6 through 28-1-1-9 correspond to the locations of the bosses 25-1-10 through 25-1-13 in FIG. 25.

The side cover portions 28-1-2 and 28-1-3 are made of a synthetic elastomer which is, for example, a polystyrene resin. The front case member 28-1 is made of a rigid resin material. Thus, the side cover portions 28-1-2 and 28-1-3 are soft, easy to hold, and resistant to slipping when they are touched by the operator.

Therefore, the Model-2 portable telephone 12 is easier to hold and less likely to drop than the Model-1 portable telephone 11.

Figure 29:
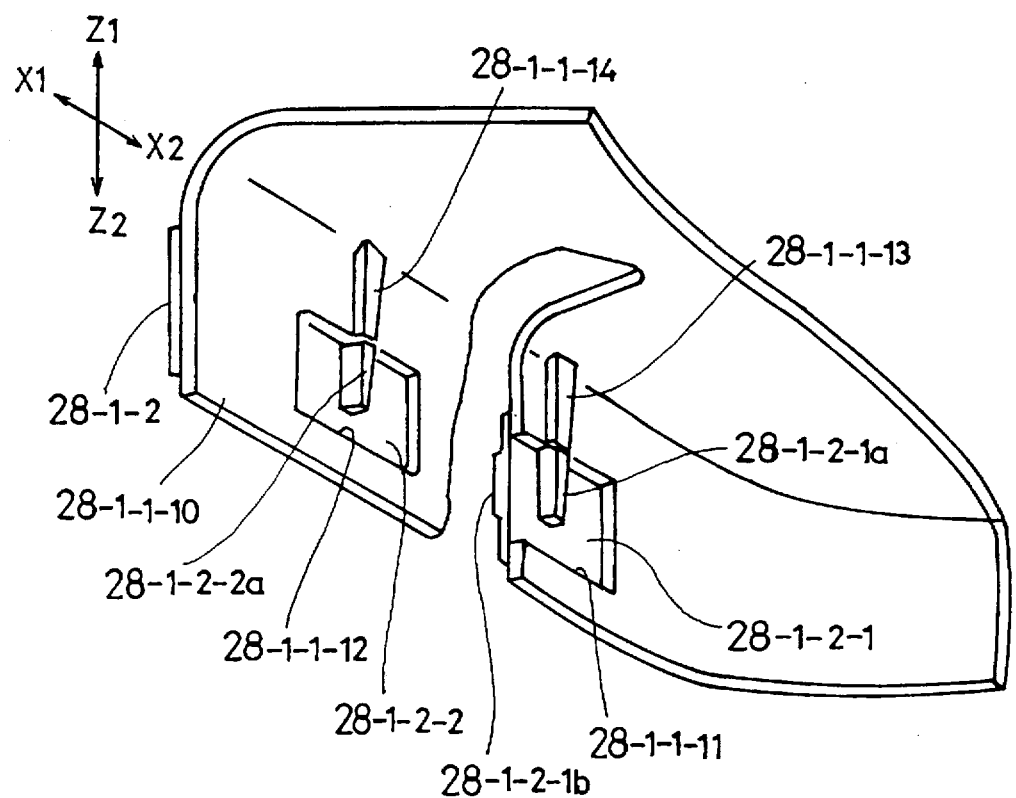
FIG. 29 is a perspective view of a back surface of a front case member.

FIG. 29 shows a back surface of the front case member 28-1. Referring to FIG. 29, a side wall portion 28-1-1-10 of the front case member 28-1 includes two rectangular openings 28-1-1-11 and 28-1-1-12 which are located at corresponding locations of the volume key module 41-10 in FIG. 6.

The above openings 28-1-1-11 and 28-1-1-12 are covered by the side cover portion 28-1-2. The front case member 28-1 includes keypad portions 28-1-2-1 and 28-1-2-2 which are the parts of the side cover portion 28-1-2 covering the openings 28-1-1-11 and 28-1-1-12. Each of the keypad portions 28-1-2-1 and 28-1-2-2 is made of a thin, flexible film, and these keypad portions are easily deformable when they are depressed.

The keypad portions 28-1-2-1 and 28-1-2-2 include ribs 28-1-2-1a and 28-1-2-2a inwardly projecting from the back surface of the front case member 28-1. When the keypad portions 28-1-2-1 and 28-1-2-2 are depressed, the volume key module 41-10 is pushed by the ribs 28-1-2-1a and 28-1-2-2a.

In order to make the volume key module 41-10 easy to depress, the outside surface of the front case member 28-1 includes volume keys 28-1-2-1b and 28-1-2-2b. The volume keys 28-1-2-1b and 28-1-2-2b outwardly project from the side wall portion 28-1-1-10 of the front case member 28-1. The volume keys are shaped into triangles which point in opposite directions.

In addition, the inside surface of the side wall portion 28-1-1-10 includes ribs 28-1-1-13 and 28-1-1-14 vertically extending from the edges of the openings 28-1-1-11 and 28-1-1-12 to the top surface of the front case member 28-1. The ribs 28-1-1-13 and 28-1-1-14 are aligned in the vertical direction with the ribs 28-1-2-1a and 28-1-2-1b.

(E-2) Molding Process for Front Case Member 28-1

Referring to FIGS. 30A through 30F, a description will be given of a two-stage molding process for the front case member 28-1.

In FIG. 30A, a molding machine 60 includes a cavity mold 61 and a core mold 62. Also, the molding machine 60 includes a mechanism which moves the core mold 62 up and down in relation to the cavity mold 61 and another mechanism which rotates the core mold 62 around a center line 63 by 180 degrees. The above mechanisms of the molding machine 60 are not shown in FIGS. 30A through 30F.

The cavity mold 61 includes a first cavity portion 61-1 and a second cavity portion 61-2 which are symmetrically arranged with respect to the center line 63. The first cavity portion 61-1 has an inside surface which is in accordance with an outside surface of the front case member 28-1. The second cavity portion 61-2 has an inside surface which is in accordance with an outside surface of the front case assembly 28 including the front case member 28-1 and the side cover portions 28-1-2 and 28-1-3 added thereto.

The core mold 62 includes a first core portion 62-1 and a second core portion 62-2 which are symmetrically arranged with respect to the center line 63. Each of the first core portion 62-1 and the second core portion 62-2 has an outside surface which is in accordance with an inside surface of the front case member 28-1.

In FIG. 30B, the core mold 62 is coupled to the cavity mold 61, and an ABS resin (an acrylonitrile-butadiene-styrene graft copolymer) is injected to the first cavity portion 61-1. A first-stage molding is carried out, and a molding 28-1-1 of the front case member 28-1 without the side cover portions is produced.

Figure 31:
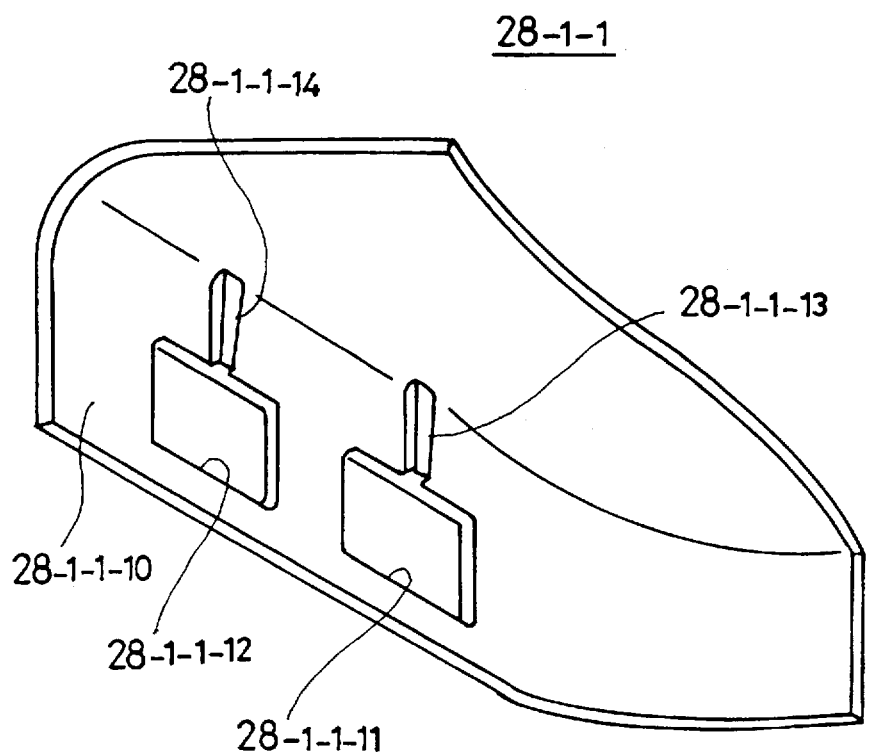
FIG. 31 is a perspective view of the front case member which is molded.

In FIG. 30C, the core mold 62 is moved down. The molding 28-1-1 of the front case member 28-1 remains on the first core portion 62-1. A back surface of this molding 28-1-1 is shown in FIG. 31.

In FIG. 30D, with the molding 28-1-1 remaining on the first core portion 62-1, the core mold 62 is rotated around the center line 63 by 180 degrees. The core mold 62 is moved up so that the core mold 62 is coupled to the cavity mold 61 again.

In FIG. 30E, the first cavity portion 61-1 is coupled to the second core portion 62-2, and the second cavity portion 61-2 is coupled to the first core portion 62-1 on which the molding 28-1-1 remains. An ABS resin is injected to the first cavity portion 61-1, and a synthetic elastmer is injected to the second cavity portion 61-2.

A second-stage molding is carried out in the second cavity portion 61-2. A molding of the front case member 28-1 to which the side cover portions 28-1-2 and 28-1-3 are added is produced.

At the same time, a first-stage molding is carried out in the first cavity portion 61-1 in the same manner as shown in FIG. 30B. A molding 28-1-1 of the front case member 28-1 without the side cover portions is produced.

Finally, in FIG. 30F, the core mold 62 is moved down from the cavity mold 61, and the molding of the front case member 28-1 including the side cover portions 28-1-2 and 28-1-3 is taken out from the core mold 62.

After the molding of the front case member 28-1 is taken out, the molding machine 60 is in a condition which is the same as the condition shown in FIG. 30C. The above-described procedures with reference to FIGS. 30C, 30D, 30E and 30F are repeated.

The ribs 28-1-1-13 and 28-1-1-14 shown in FIG. 31 serve to partially close recessed portions (corresponding to the ribs 28-1-2-1a and 28-1-2-2a) of the core mold 62 during the second-stage molding.

(E-3) Keypad 27

Referring to FIG. 28, the keypad 27 includes a plurality of key portions 27-1 which are arrayed in rows and columns. The key portions 27-1 are marked by the numerals, the characters and the signs corresponding to the functions of the Model-2 portable telephone 12.

The keypad 27 includes locating holes 27-2 and 27-3 which correspond to the locating holes 42-2 and 42-3 of the key-contact plate 42 in FIG. 6. The locating portions 40-26 and 40-27 upwardly projecting from the top of the shield case 40 are fitted into the locating holes 42-2 and 42-3 of the key-contact plate 42 and into the locating holes 27-2 and 27-3 of the keypad 27. The keypad 27 is placed on the bottom of the ten key case portion 28-1-1-2.

(F) LCD ASSEMBLY 41-2

Figure 32:
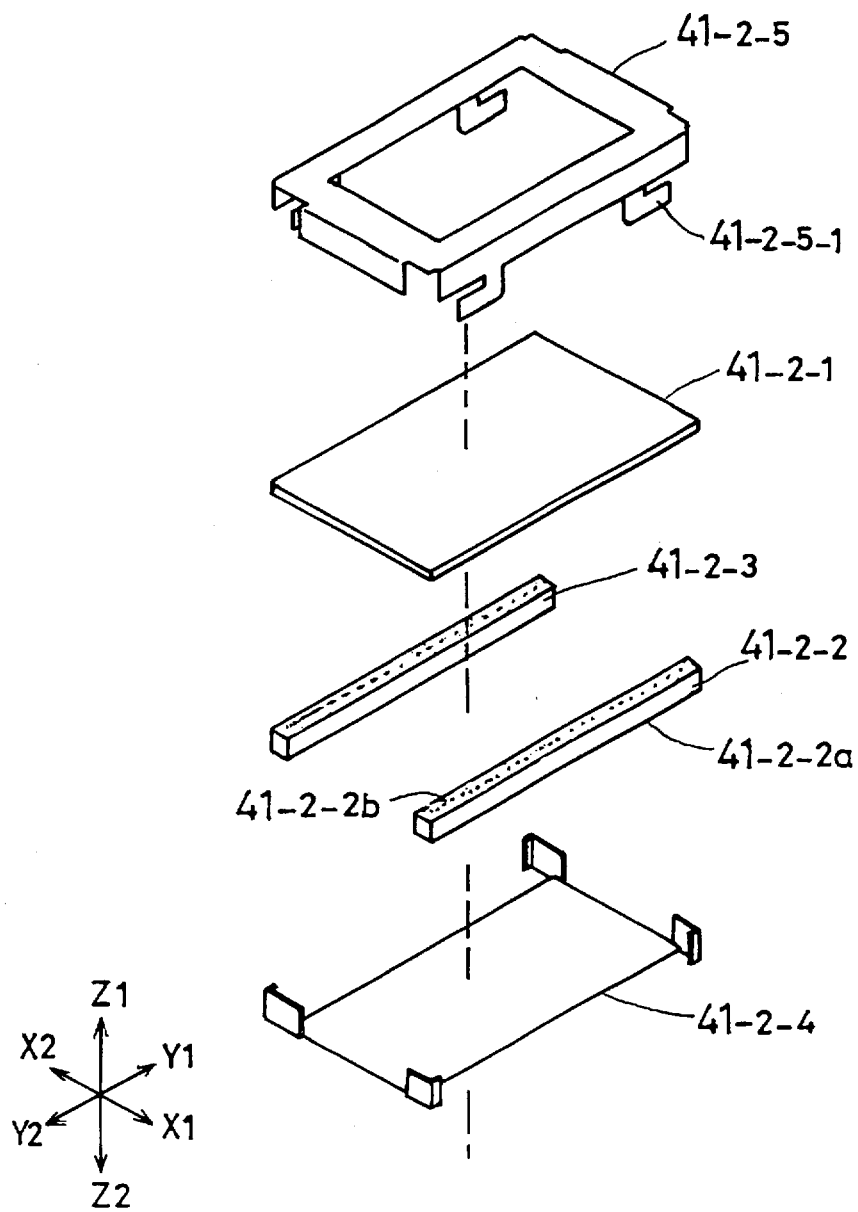
FIG. 32 is an exploded view of a liquid crystal display assembly.

FIG. 32 shows a construction of the liquid crystal display (LCD) assembly 41-2. The LCD assembly 41-2 shown in FIG. 6 includes a liquid crystal plate 41-2-1, two rubber connectors 41-1-2 and 41-2-3, a bottom member 41-2-4, and a frame member 41-2-5 which are independently provided. The liquid crystal plate 41-2-1 and the rubber connectors 41-2-2 and 41-2-3 are placed between the bottom member 41-2-4 and the frame member 41-2-5.

When the LCD assembly 41-2 is thus constructed, the cost of the manufacture of the LCD assembly 41-2 is lower than the cost of the manufacture of a conventional LCD assembly in the conventional portable telephone.

The frame member 41-2-5 is a pressed sheet-metal part and includes a plurality of bent portions 41-2-5-1. Each of the rubber connectors 41-2-2 and 41-2-3 is a rectangular block 41-2-2a of rubber, and a plurality of small connector pins 41-2-2b are embedded in and passed through the rectangular block 41-2-2a. The frame member 41-2-5 is secured to the bottom member 41-2-4 by connecting the bent portions 41-2-5-1 to the bottom member 41-2-4.

The rubber connectors 41-2-2 and 41-2-3 are compressed, and the liquid crystal plate 41-2-1 and the bottom member 41-2-4 are electrically connected by the rubber connectors 41-2-2 and 41-2-3.

The liquid crystal plate 41-2-1 has no back light source. As shown in FIG. 6, the light-emitting diodes 41-4 which are the back light source are soldered to the front printed-circuit board 41. The light-emitting diodes 41-4 are automatically packaged with the front printed-circuit board 41, and no assembly operations are needed to attach the light-emitting diodes 41-4.

(G) INTERNAL CONSTRUCTION OF MODEL-1 AND MODEL-2 PORTABLE TELEPHONES

The Model-1 and Model-2 portable telephones 11 and 12 are assembled according to the following procedures.

(1) The body assembly 22 is placed into the rear case assembly 22 and the tapping screws 54 and 55 are fastened. The tapping screw 54 is passed through the hole 23-1-13 (FIG. 17) and the hole 45-1-3 (FIG. 13), and connected to the hole 40-20 (FIG. 9). The tapping screw 55 is passed through the hole 23-1-14 (FIG. 17) and the hole 45-1-4 (FIG. 13), and connected to the hole 40-21 (FIG. 9). By the tapping screws 54 and 55, the body assembly 22 is secured to the rear case assembly 23.

(2) The front case assembly 25 (or 28) is connected to the rear case assembly 23 to enclose the body assembly 22, and the tapping screws 50–53 are fastened. By the tapping screws 50–53, the body assembly 22 is tightened with the rear case assembly 23 and the front case assembly 25 (or 28) at the four corners.

Next, a description will be given of the internal construction of the Model-1 and Model-2 portable telephones 11 and 12.

Figure 33:
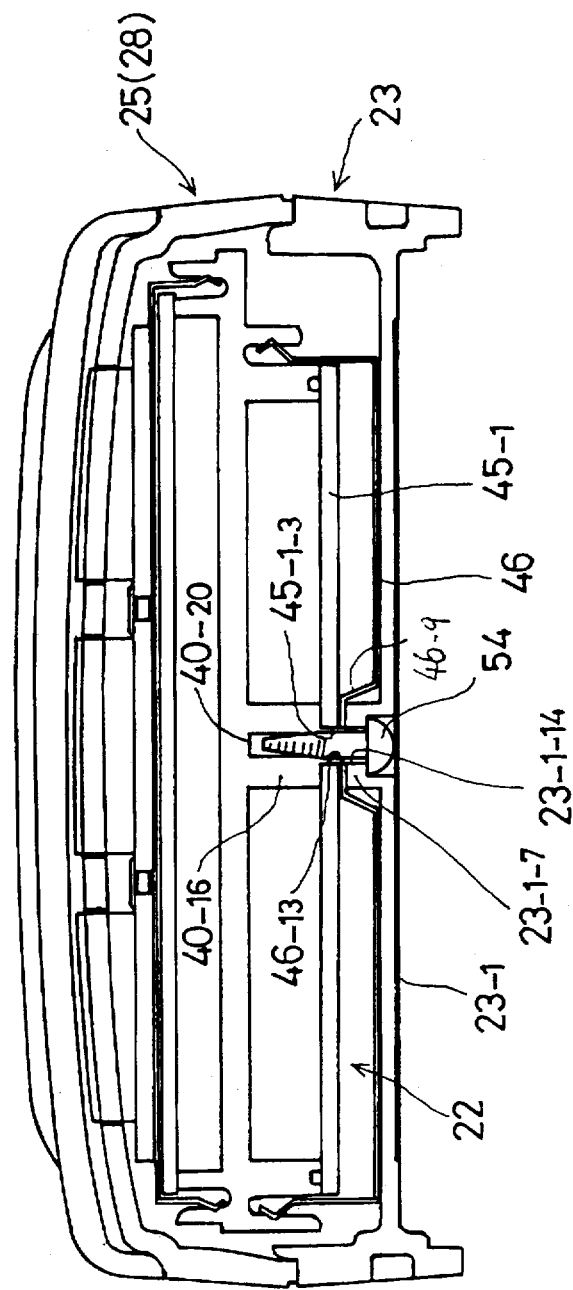
FIG. 33 is a cross-sectional view of each of the Model-1 and Model-2 portable telephones taken along a line XXXIII—XXXIII in FIG. 1.

FIG. 33 shows a cross-section of the Model-1 and Model-2 portable telephones 11 and 12 taken along the line XXXIII—XXXIII in FIG. 1. This cross-section intersects the position of the tapping screw 54.

Referring to FIG. 33, the tapping screw 54 is passed through the hole 23-1-14 of the boss 23-1-7 of the rear case member 23-1, the hole 46-13 of the shield plate 46, and the hole 45-1-3 of the rear printed-circuit board 45-1. The tapping screw 54 is connected to the hole 40-20 of the boss 40-16 of the shield case 40. (See FIGS. 7 and 9.)

The tapping screw 55 is connected in the same manner as the above-described tapping screw 54. The body assembly 22 is thus secured to the rear case assembly 23.

Figure 34:
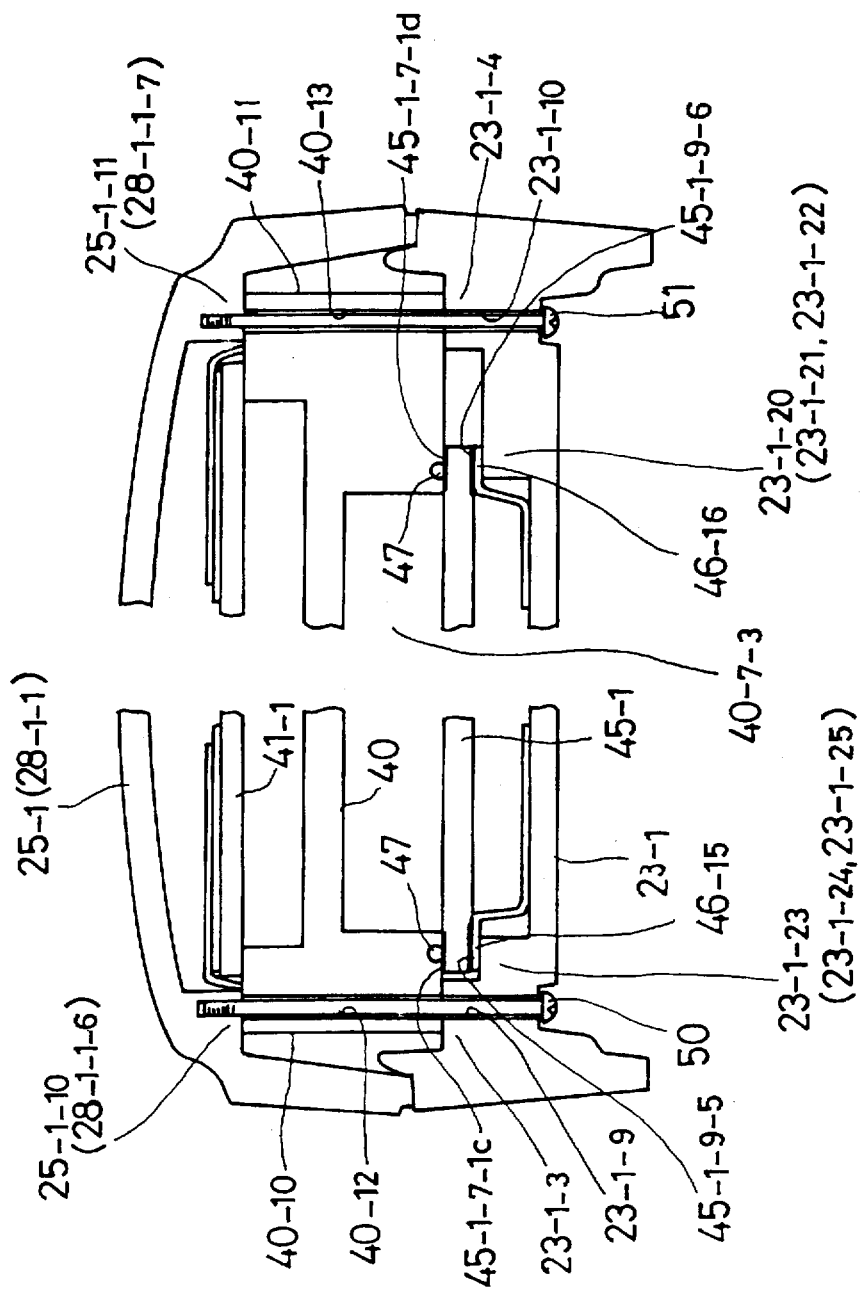
FIG. 34 is a cross-sectional view of each of the Model-1 and Model-2 portable telephones taken along a line XXXIV—XXXIV in FIG. 1.

FIG. 34 shows a cross section of the Model-1 and Model-2 portable telephones 11 and 12 taken along the line XXXIV—XXXIV in FIG. 1. This cross section intersects the positions of the tapping screws 50 and 51.

Referring to FIG. 34, the tapping screw 50 is passed through the hole 23-1-9 of the boss 23-1-3 of the rear case member 23-1 and the hole 40-12 at the corner of the shield case 40. The tapping screw 50 is connected to the hole of the boss 25-1-10 (or 28-1-1-6) of the front case member 25-1 (or 28-1).

Similarly, the tapping screw 51 is passed through the hole 23-1-10 of the boss 23-1-4 of the rear case member 23-1 and the hole 40-13 at the corner of the shield case 40. The tapping screw 51 is connected to the hole of the boss 25-1-11 (or 28-1-1-7) of the front case member 25-1 (or 28-1).

The rear case member 23-1 and the front case member 25-1 (or 28-1) are secured to each other by the tapping screws 50 and 51 at the corners of the shield case 40.

The bent portion 46-16 of the shield plate 46 is pressed to the grounding pattern portion 45-1-9-6 on the bottom of the rear printed-circuit board 45-1 by the three ribs 23-1-20 through 23-1-22 of the rear case member 23-1. The grounding pattern portion 45-1-7-1d on the top of the rear printed-circuit board 45-1 is pressed by the shield packing 47 on the bottom of the recessed portion 40-3 of the shield case 40.

Similarly, the bent portion 46-15 of the shield plate 46 is pressed to the grounding pattern portion 45-1-9-5 on the bottom of the rear printed-circuit board 45-1 by the three ribs 23-1-23 through 23-1-25 of the rear case member 23-1. The grounding pattern portion 45-1-7-1c on the top of the rear printed-circuit board 45-1 is pressed by the shield packing 47 on the bottom of the recessed portion 40-3 of the shield case 40.

Accordingly, the rear printed-circuit board 45-1 and the shield plate 46 are secured to the shield case 40 with an appropriate fastening force, although they are not secured to each other by the tapping screws 50 and 51. The rear printed-circuit board 45-1 and the shield plate 46 are uniformly secured to the shield case 40 because they are pressed by the ribs 23-1-20 through 23-1-22 and the ribs 23-1-23 through 23-1-25 which are spaced apart along the directions X1 and X2.

FIG. 35 shows a cross section of the Model-1 and Model-2 portable telephones 11 and 12 taken along the line XXXV—XXXV in FIG. 1. This cross section intersects the positions of the tapping screws 52 and 53.

Referring to FIG. 35, the tapping screw 52 is passed through the hole 23-1-11 (FIG. 17) of the boss 23-1-5 of the rear case member 23-1, the hole 46-6 (FIG. 7) of the bent portion 46-4 of the shield plate 46, the hole 40-18 of the shield case 40, the hole 45-1-1 of the rear printed-circuit board 45-1, the hole 41-1-5 of the front printed-circuit board 41-1, and the hole of the boss 44-1-1 of the holder 44-1. The tapping screw 52 is connected to the hole of the boss 25-1-12 (or 28-1-1-8) of the front case member 25-1 (or 28-1).

Similarly, the tapping screw 53 is passed through the hole 23-1-12 (FIG. 17) of the boss 23-1-6 of the rear case member 23-1, the hole 46-7 (FIG. 7) of the bent portion 46-5 of the shield plate 46, the hole 40-19 of the shield case 40, the hole 45-1-2 of the rear printed-circuit board 45-1, the hole 41-1-2 of the front printed-circuit board 41-1, the hole of the shield plate 41-9, and the hole of the boss 44-1-2 of the holder 44-1. The tapping screw 53 is connected to the hole of the boss 25-1-13 (or 28-1-1-9) of the front case member 25-1 (or 28-1).

Accordingly, the rear case member 23-1 and the front case member 25-1 (or 28-1) are secured to each other by the tapping screws 52 and 53 at the corners thereof.

In addition, the heads of the tapping screws 54 and 53 are inserted in recessed portions of the rear case member 23-1. Caps 70 and 71 are fitted in the recessed portions of the rear case member 23-1 to cover the heads of the tapping screws 52 and 53. The caps 70 and 71 include projections 70a and 71a, and the projections 701 and 71a are fitted to the recessed portions to prevent the separation of the caps 70 and 71 from the rear case member 23-1.

Figure 36:
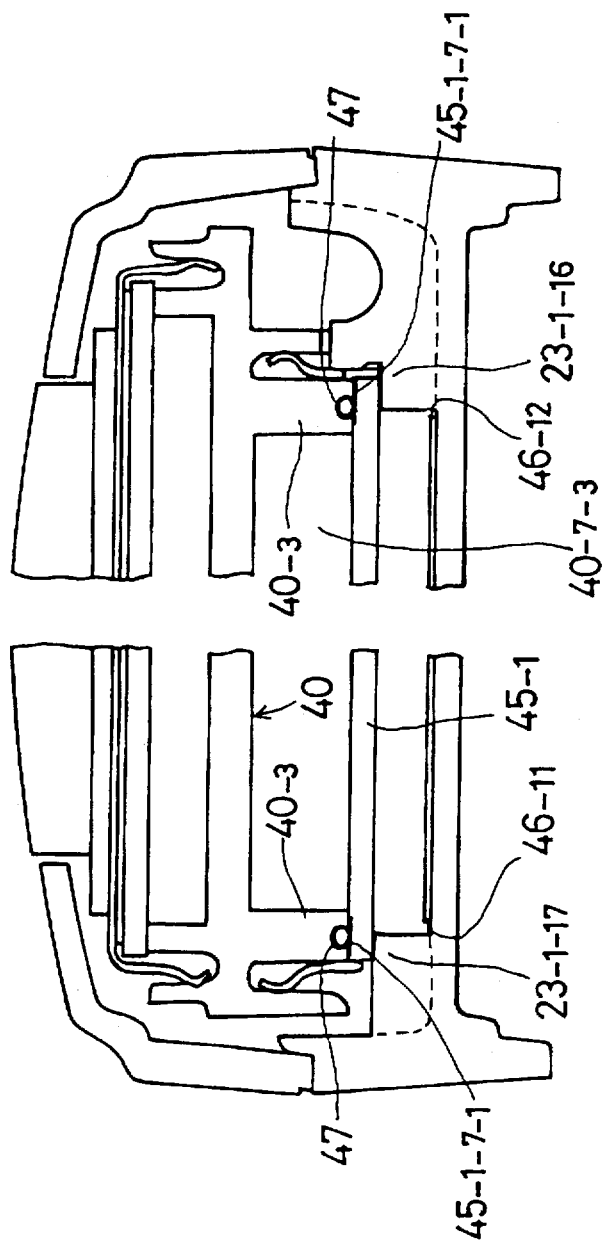
FIG. 36 is a cross-sectional view of each of the Model-1 and Model-2 portable telephones taken along a line XXXVI—XXXVI in FIG. 1.

FIG. 36 shows a cross section of the Model-1 and Model-2 portable telephones taken along the line XXXVI—XXXVI in FIG. 1.

Referring to FIG. 36, the ribs 23-1-16 and 23-1-17 of the rear printed-circuit board 45-1 enter the cut-out portions 46-12 and 46-11 of the shield plate 46, and the bottom of the rear printed-circuit board 45-1 is pressed toward the shield case 40 by the ribs 23-1-16 and 23-1-17.

Accordingly, the top of the rear printed-circuit board 45-1 is pressed to the recessed portion 40-3 via the shield packing 47 on the bottom of the shield case 40.

Similarly to the above-described ribs 23-1-16 and 23-1-17, the ribs 23-1-18 and 23-1-19, shown in FIG. 17, also press the bottom of the rear printed-circuit board 41-1 toward the shield case 40.

The rear printed-circuit board 45-1 is pressed toward the shield case 40 by the ribs 23-1-16 through 23-1-19 not by the tapping screws. Therefore, this makes it possible that the portable radiotelephone terminal of the present invention have the following advantages.

(1) Rattling of the rear printed-circuit board 45-1 provided within the portable radiotelephone terminal can be prevented and a reliability of the rear printed-circuit board 45-1 is increased.

(2) Good shielding characteristics of the portions 40-7-1, 40-7-2 and 40-7-3 of the body assembly 22 can be provided.

Figure 37:
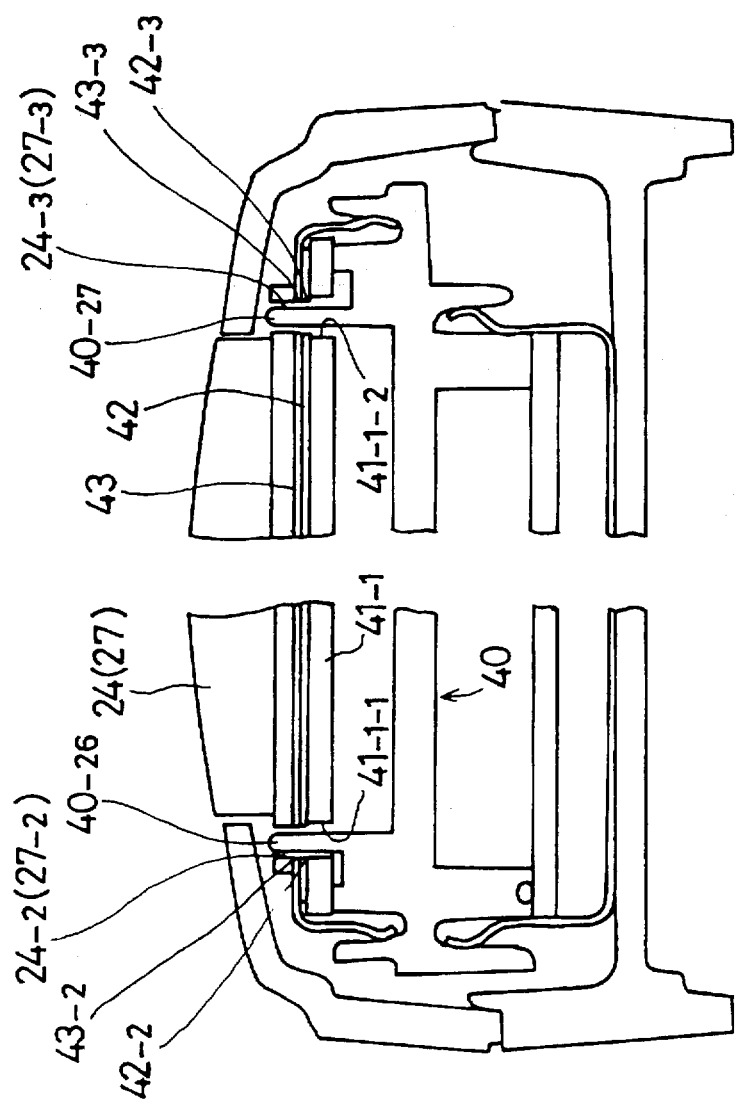
FIG. 37 is a cross-sectional view of each of the Model-1 and Model-2 portable telephones taken along a line XXXVII—XXXVII in FIG. 1.

FIG. 37 shows a cross section of the Model-1 and Model-2 portable telephones taken along the line XXXVII—XXXVII in FIG. 1.

Referring to FIG. 37, the key-contact plate 42, the shield plate 43, and the keypad 24 (or 27) are properly located relative to the shield case 40 by fitting the locating portion 40-26 into the locating holes 42-2, 43-2, and 24-2 (or 27-2) and fitting the locating portion 40-27 into the locating holes 42-3, 43-3, and 24-3 (or 27-3). The front printed-circuit board 41 is properly located relative to the shield case 40 by fittings at different locations.

The above-described embodiment makes it possible that the electrical connections of the key-contact plate 42, the grounding pattern of the front printed-circuit board 41-1, and the keypad 24 (or 27) be retained even when the shield case 40 is misaligned within the case assembly 26 (or 29).

Accordingly, the above-described embodiment provides a high reliability of the ten key portions of the Model-1 and Model-2 portable radiotelephones 11 and 12.

(H) OTHERS

The present invention is applicable to not only portable telephones but also other portable radiotelephone terminals.

Further, the present invention is not limited to the above-described embodiment, and variations and modifications may be made without departing from the scope of the present invention.

What is claimed is:

1. A portable radiotelephone terminal comprising:
   a body assembly including a speaker unit, a microphone unit and switch means which carry out a radio communication;
   a rear case assembly; and
   a front case assembly associated with said rear case assembly for enclosing said body assembly,
   wherein said front case assembly comprises a front case member made of a synthetic resin and side cover portions made of a synthetic elastomer, said front case member and said side cover portions comprising two moldings produced by using a set of cavity and core molds, wherein said body assembly further comprises a front printed-circuit board, light-emitting diodes provided on side portions of a top of the front printed-circuit board, and a liquid crystal display assembly provided on the top of the front printed-circuit board at a location between said light-emitting diodes, said liquid crystal display assembly including a bottom member, a frame member, a liquid crystal plate and rubber connectors, said liquid crystal plate and said rubber connectors being placed between said bottom member and said frame member.

2. The portable radiotelephone terminal according to claim 1, wherein said body assembly comprises a volume key module which controls a volume of sound generated by the speaker unit, said volume key module including volume keys provided on a side surface of the body assembly, wherein said front case member comprises openings in a side surface of the front case member, said volume keys of said volume key module being placed into said openings and thus outwardly projecting from the side surface of the front case member.

3. The portable radiotelephone terminal according to claim 1, wherein said rear case assembly and said front case assembly constitute a case assembly for enclosing said body assembly, said case assembly comprising a side surface on which volume keys used to control a loudness of a sound generated by the speaker unit are provided, and a projection provided between said volume keys on the side surface, said projection having a height from the side surface which is the same as a height of said volume keys from the side surface, thereby preventing said volume keys from being erroneously depressed.

4. A portable radiotelephone terminal comprising:

a body assembly including a speaker unit, a microphone unit and switch means which carry out a radio communication;

a rear case assembly; and a front case assembly associated with said rear case assembly for enclosing said body assembly, said body assembly comprising:

a shield case including a flat portion and recessed portions downwardly projecting from a bottom of the flat portion, said recessed portions being provided on peripheral portions of a bottom of the shield case;

a shield packing fitted in grooves of the recessed portions of the shield case, said shield packing being made of a conductive rubber and provided along the recessed portions of the shield case; and a rear printed-circuit board provided below the shield case, the rear printed-circuit board having a grounding pattern which is in accordance with the recessed portions of the shield case, said grounding pattern being brought into contact with the shield packing, said rear case assembly comprising a rear case member having a plurality of ribs to which a bottom of the rear printed-circuit board is connected, wherein said shield case of said body assembly is connected to said rear case assembly such that the bottom of the rear printed-circuit board is pressed by said ribs, a top of the rear printed-circuit board is pressed by the recessed portions of the shield case, and the grounding pattern of the rear printed-circuit board is press fitted to the shield packing.

5. The portable radiotelephone terminal according to claim 4, wherein a pipe portion of an antenna assembly is fitted to one of said ribs, said one of said ribs having supporting portions for supporting the pipe portion of the antenna assembly.

6. The portable radiotelephone terminal according to claim 4, wherein said body assembly further comprises:

a front printed-circuit board, provided above said shield case, which includes locating holes;

locating portions, upwardly projecting from a top of the shield case, which are fitted to the locating holes of the front printed-circuit board;

a key-contact plate, provided on a top of the front printed-circuit board, which includes locating holes to which said locating portions of the shield case are fitted; and a keypad, provided on a top of the key-contact plate, which includes locating holes to which said locating portions of the shield case are fitted, wherein said front printed-circuit board, said key-contact plate, and said keypad are located on the shield case by fitting the locating portions of the shield case into the respective locating holes.

7. The portable radiotelephone terminal according to claim 4, wherein said rear case assembly further comprises an antenna assembly attached to the rear case member, said antenna assembly being electrically connected to an antenna circuit of the rear printed-circuit board and comprising:

an antenna power-supply plate connected to the rear case member;

an antenna cylinder connected to said antenna power-supply plate and including a helical coil antenna; and a rod antenna retractably provided within said antenna cylinder, said antenna power-supply plate comprising a plate member including a burring portion, said burring portion having a threaded inside wall, said plate member being fitted to the rear case member, and a threaded outside wall of an end portion of said antenna cylinder being fitted to the threaded inside wall of the burring portion.

8. A portable radiotelephone terminal comprising:

a body assembly including a speaker unit, a microphone unit and switch means which carry out a radio communication;

a rear case assembly; and a front case assembly, connected to said rear case assembly by fastening screws, for enclosing said body assembly, said body assembly comprising:

a shield case including a flat portion and recessed portions provided on a bottom of the flat portion;

a shield packing fitted in grooves of the recessed portions of the shield case, said shield packing made of a conductive rubber and downwardly projecting from the bottom of the flat portion; and a rear printed-circuit board provided below the shield case, the rear printed-circuit board having a grounding pattern which is in accordance with the recessed portions of the shield case, said grounding pattern being contacted with the shield packing, said shield case including holes into which said screws are inserted, said holes provided at corners of the shield case, said rear case assembly comprising a rear case member which includes a bottom portion, a peripheral wall portion, and a plurality of bosses provided on said bottom portion at locations of the corners of the shield case, said bosses including holes into which said screws are inserted, and said bosses supporting the corners of the shield case, wherein said corners of said shield case of said body assembly are connected to said rear case assembly and said front case assembly by fastening said screws such that portions of the rear printed-circuit board adjacent to said corners of said shield case are pressed by said rear case member, a top of the rear printed-circuit board is pressed by the recessed portions of the shield case, and the grounding pattern of the rear printed-circuit board is press fitted to the shield packing.

9. The portable radiotelephone terminal according to claim 8, wherein said rear case member of said rear case assembly further includes radially extending ribs each of which radially extends from one of said bosses on the bottom portion of the rear case member.

* * * * *